(12) United States Patent
Wenzel et al.

(10) Patent No.: US 10,533,691 B2
(45) Date of Patent: Jan. 14, 2020

(54) HEATABLE LINE CONNECTION DEVICE AND METHOD FOR PRODUCING SUCH A CONNECTION

(71) Applicant: VOSS AUTOMOTIVE GMBH, Wipperfürth (DE)

(72) Inventors: Daniel Wenzel, Wipperfürth (DE); Martin Sachse, Wipperfürth (DE); Sascha Rosenfeldt, Wipperfürth (DE); Christian Zwillus, Bergneustadt (DE)

(73) Assignee: VOSS AUTOMOTIVE GMBH, Wipperfürth (DE)

( * ) Notice: Subject to any disclaimer, the term of this patent is extended or adjusted under 35 U.S.C. 154(b) by 355 days.

(21) Appl. No.: 15/305,909

(22) PCT Filed: Apr. 24, 2015

(86) PCT No.: PCT/EP2015/000854
§ 371 (c)(1),
(2) Date: Oct. 21, 2016

(87) PCT Pub. No.: WO2015/161930
PCT Pub. Date: Oct. 29, 2015

(65) Prior Publication Data
US 2017/0045173 A1 Feb. 16, 2017

(30) Foreign Application Priority Data
Apr. 24, 2014 (DE) .......................... 10 2014 005 817

(51) Int. Cl.
*F16L 53/38* (2018.01)
*F16L 41/00* (2006.01)
*F16L 41/02* (2006.01)

(52) U.S. Cl.
CPC ............. *F16L 53/38* (2018.01); *F16L 41/008* (2013.01); *F16L 41/021* (2013.01); *Y10T 29/49826* (2015.01)

(58) Field of Classification Search
CPC ......... F16L 53/38; F16L 53/30; F16L 41/008; F16L 41/021; G01L 19/06; H05B 3/58
(Continued)

(56) References Cited

U.S. PATENT DOCUMENTS 7,266,293 B1 * 9/2007 Dundas .................... H05B 3/58
7,553,079 B1 6/2009 Khan et al.
(Continued)

FOREIGN PATENT DOCUMENTS

DE 10 2009 060 363 A1 6/2011
EP 1 985 908 A1 10/2008
(Continued)

*Primary Examiner* — Zachary T Dragicevich
(74) *Attorney, Agent, or Firm* — Hudak, Shunk & Farine Co. LPA

(57) ABSTRACT

A multipart heatable media line including at least two sub-media lines, at least one heating element for heating the sub-media lines, at least one line connection device with connection sections for connecting to the sub-media lines, and at least one measuring device. The line connection device has at least one medium channel for conducting the medium through the line connection device from one connection section to the at least one other connection section, and the measuring device including at least one sensor element and is received in a line connection device receiving opening which is designed as a coupling portion. The measuring device includes at least one housing which is designed as a plug connector and which at least partly receives the at least one sensor element, and the at least one heating element of the at least one sub-media line extends in the region of the coupling portion for receiving the measur-
(Continued)

ing device in order to heat the line connection device in the arrangement region of the measuring device.

27 Claims, 15 Drawing Sheets

(58) Field of Classification Search
USPC .......................................... 285/41; 137/341
See application file for complete search history.

(56) References Cited

U.S. PATENT DOCUMENTS

| 2008/0085220 A1* | 4/2008 | Felix ..................... F16L 53/38 |
| 2009/0107558 A1* | 4/2009 | Quigley ................. F16L 53/38 |
| | | 137/341 X |
| 2013/0220467 A1 | 8/2013 | Ristovski et al. |

FOREIGN PATENT DOCUMENTS

| EP | 2 339 306 A2 | 6/2011 |
| WO | 2013083273 A1 | 6/2013 |
| WO | 2013130810 A1 | 9/2013 |

* cited by examiner

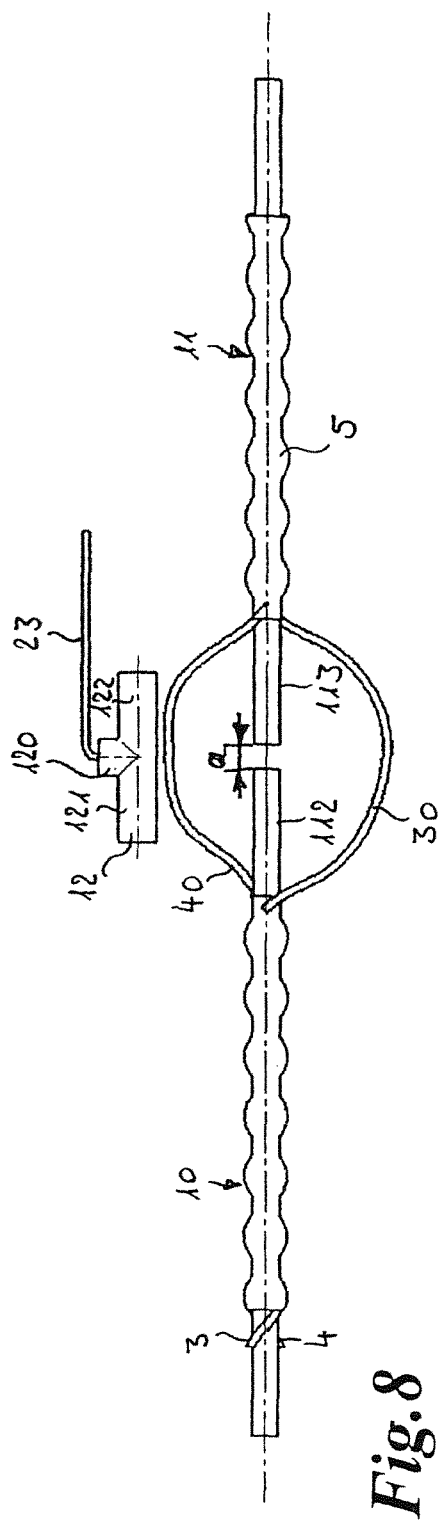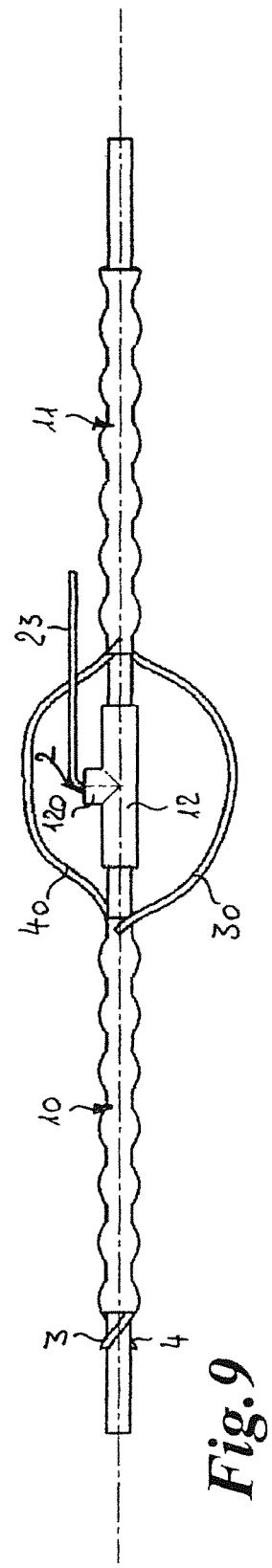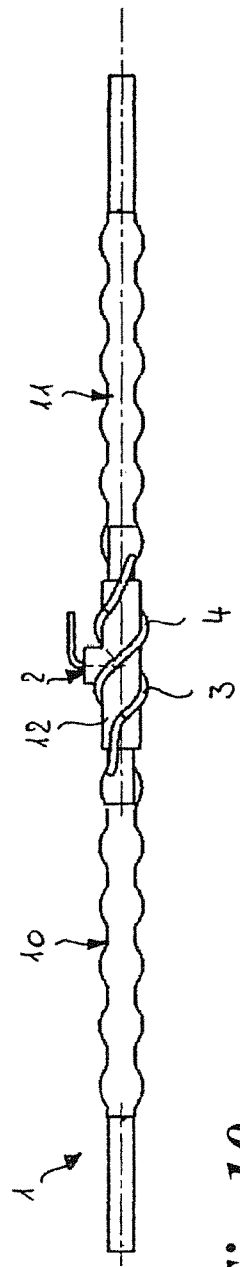

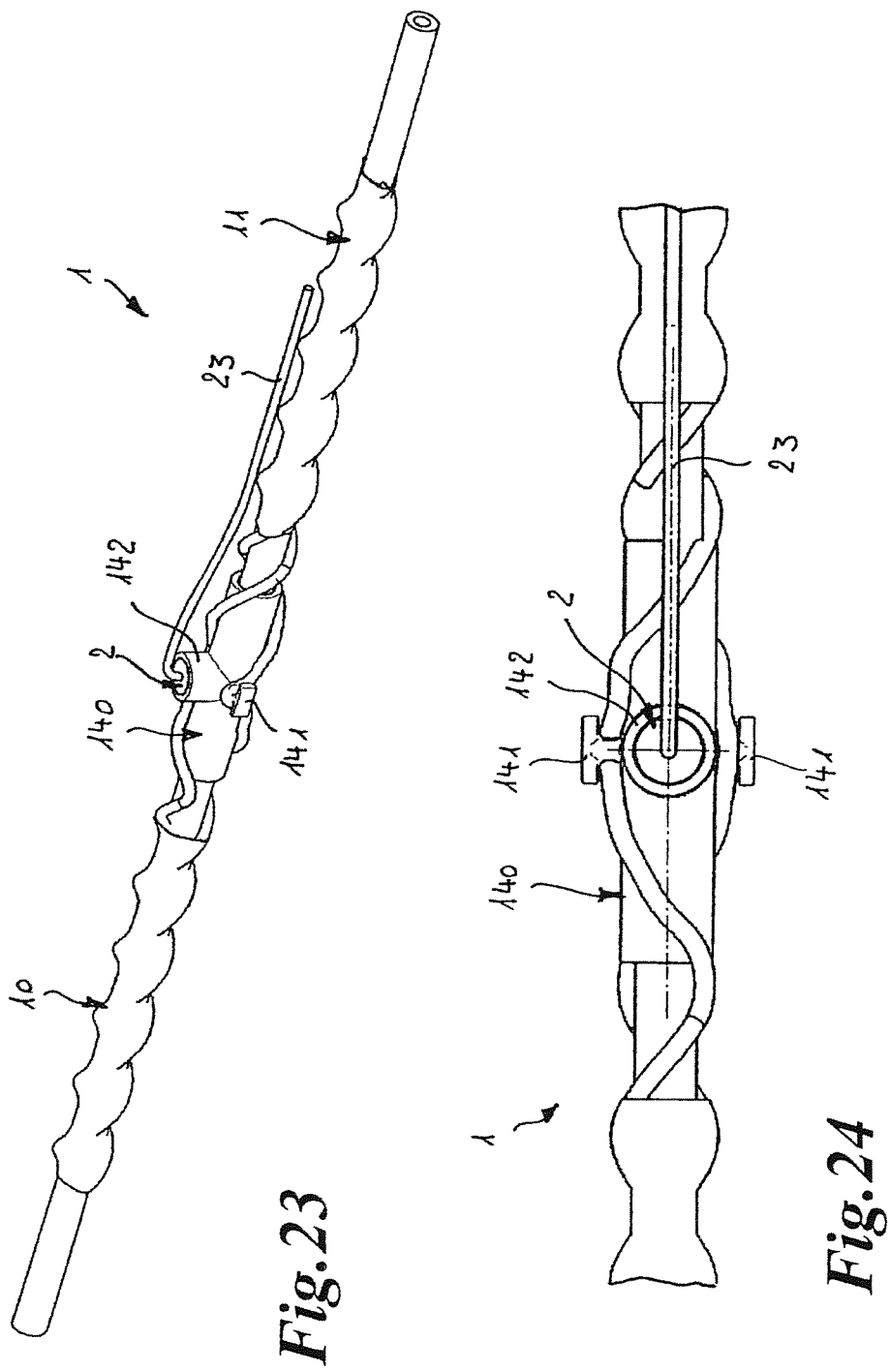

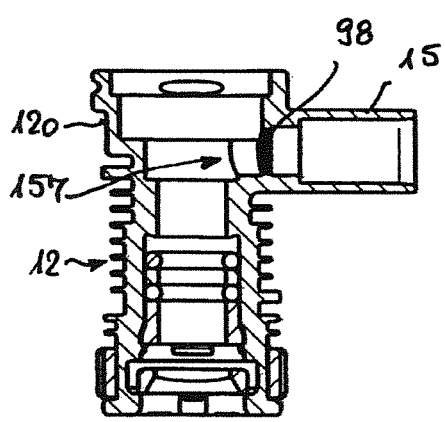 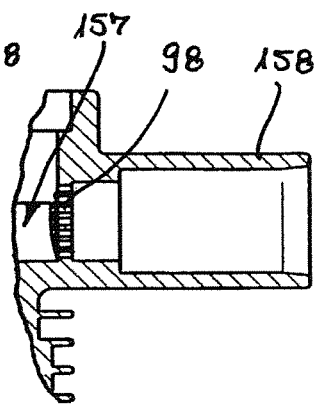 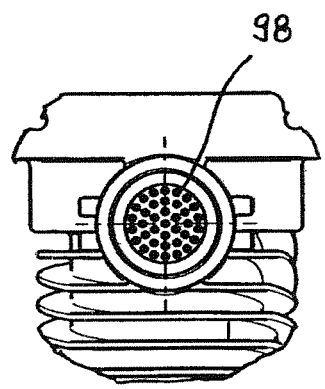
*Fig.42*    *Fig.42a*    *Fig.42b*
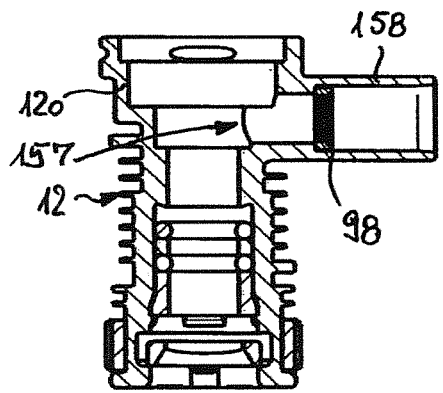 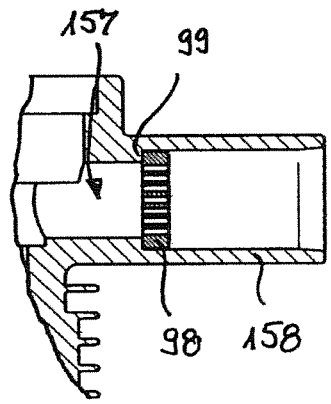 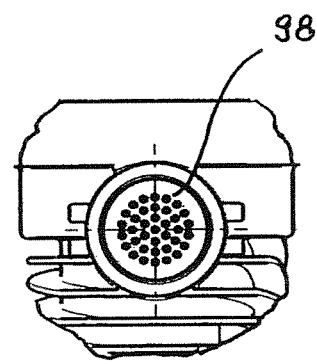
*Fig.43*    *Fig.43a*    *Fig.43b*

HEATABLE LINE CONNECTION DEVICE AND METHOD FOR PRODUCING SUCH A CONNECTION

FIELD OF THE INVENTION

The invention relates to a multipart heatable media line, comprising two sub-media lines, at least one heating element for heating the sub-media lines, at least one line connection device with connection sections for connecting to the sub-media lines and at least one measuring device, wherein the line connection device has at least one medium channel for conducting the medium through the line connection device from one connection section to the at least one other connection section and wherein the measuring device comprises at least one sensor element and is received in a receiving opening of the line connection device. The invention also relates to a method of producing such a multipart heatable media line as well as a line connection device with at least two connection sections for connecting to at least two media lines or sub-media lines or one media line or sub-media line with a unit and with at least one medium channel for medium to flow through, wherein at last one heating element for heating a medium flowing through the line connection device and/or at least one insulating device for the thermal insulation of the line connection device is/are provided.

BACKGROUND OF THE INVENTION

Line connection devices for connecting at least two media lines or sub-media lines or one media line with a unit as well as multipart heatable media lines comprising such line connection devices and (sub-)media lines are known in the prior art. The media line can be pipe or hose lines. On the one hand the line connection device can serve to connect sub-media lines or media lines and on the other hand to connect a media line with a unit or connection device of a unit. At the connection ends all these components are connected to the line connection device. The connection ends can therefore be designed in various forms, e.g. as coupling portions for receiving plug components, as connection sections that can connected to the media lines in a bonded manner, as mandrel sections for flare fitting, in particular of hose lines etc.

Multipart heatable media lines for conducting fluid media are used in particular in vehicles, wherein the line connection devices are used for the coupling or interconnection of several heatable sub-media lines to the multipart heatable media lines. For transporting medium within the line connection device, provided therein is an inner medium channel or a channel-like through opening which extends between the connection ends and has a sufficiently dimensioned inner diameter or adequate clearance for medium to be conveyed through. In the interior of the line connection device the medium channel therefore forms a fluid or flow connection of the at least two connection ends thereof.

At low temperatures the medium flowing through the media lines or sub-media lines is at risk of freezing, for which reason it is also known to heat these lines and the line connection device connecting them. Media are often conducted through the multipart heatable media line which due to a relative high freezing point often tend to freeze at still quite high ambient temperatures, as a result of which the functioning, of a vehicle for instance, is impaired or even seriously disrupted. This is clearly the case in connection with media lines conveying water as well as media lines through which an aqueous urea solution flows as medium, used as an NO reaction additive with so-called SCR catalysts (SCR=Selective Catalytic Reduction). Therefore a possibility or heating the media line, or at least parts thereof and the line connection device, is envisaged in order prevent freezing of the medium within the multipart heatable media line or to allow thawing of an already frozen medium. Additionally, for the external thermal insulation and also for protection against damage, it is also known to provide multipart heatable media lines, including the line connection device and various transition areas between these with at least one insulation device or encapsulation. Devices for heating a line connection device and also an outer encapsulation are known from EP 1 985 908 B1 for example.

In order to monitor and control the properties of the medium flowing through the media lines or multipart heatable media lines, particularly during the operation of the vehicle, but also while it is at a standstill, it is also known to provide measuring devices in the region of line connection devices which connect several sub-media lines to form one multipart media line. Such measuring devices can be permanently integrated herein, as disclosed, for example, in DE 10 2009 060 363 A1, or arranged as plug-type connections in a corresponding coupling portion in the line connection device, as disclosed in WO 2013/130810 A1. According to this prior art document a sensor holder is provided in an SCR system which comprises a pipe, a chamber and a retaining device. The pipe has an inlet for receiving fluid flowing in from a first SCR line and an outlet for conducting outflowing fluid to a second SCR line. The pipe also has a through opening extending between the inlet and the outlet. The chamber has an interior which is accessible from the through opening for receiving an SCR sensor, and an opening leading to the interior. The retaining device has a section which can be moved into the chamber opening. On moving the section in the opening in the direction of the interior the section comes into contact with the SCR sensor and holds the sensor firmly in the holder. On moving the section away from the interior it is possible to release the SCR sensor from the holder. It is also disclosed that at least one resistor wire can be arranged around at least one section of the pipe and the media line in order to emit heat into the pipe.

For sealing off the electronic component of the sensor or the sensor element itself from the medium flowing through the pipe, the SCR system according to WO 2013/130810 A1 requires seals. If the medium freezes within the pipe provided with the sensor, the pipe can be damaged by the forming ice. In particular, through the frozen medium, which takes up a greater volume compared with the fluid medium, the sensor could be pushed out of its sensor holder or at least be jammed into its position and possibly be damaged thereby. Additionally, due to the displacement, possibly also of the seals, leakage cannot be avoided on thawing out.

SUMMARY OF THE INVENTION

The aim of the present invention is therefore to provide a multipart heatable media line comprising at least two sub-media lines, at least one heating element for heating the sub-media lines, at least one line connection device with connection sections for connecting to the sub-media lines and at least one measuring device, wherein the line connection device has at least one medium channel for conducting a medium through the line connection device from one connection section to the at least one another connection section and wherein the measuring device comprises at least one sensor element and is received in a receiving opening of the line connection device designed as a coupling portion or a method of producing this and a line connection device for such a multipart heatable media line in which the cited problems of the prior art, which come about in particular as a result of freezing medium, no longer occur.

For a multipart heatable media line this task is solved in that the measuring device comprises at least one housing which is designed as a plug-type connection and at least partially receives the at least one sensor element and the at least one heating element of the at least one sub-media line extends in the region of the coupling portion for receiving the measuring device in order to heat the line connection device in the arrangement region of the measuring device. For a line connection element with at least two connection sections for connecting to at least two media lines or sub-media lines or one media line or sub-media line with a unit and with at least one medium channel for throughflow of medium, wherein at least one heating element for heating a medium flowing through the line connection device and/or at least one insulating device for thermal insulation of the line connection device is/are provided, the tasks is solved in that at least one coupling portion is provided which is spatially arranged between the connection sections of the line connection devices and into which at least one measuring element for measuring at least one parameter of a medium flowing through the medium channel of the line connection devices is or can be inserted, wherein at least one fastening or fixing device for attaching the heating element for heating the coupling portion and/or the medium flowing in the region of coupling portion is provided. For a method of producing a multipart heatable media line this task is solved in that a pre-assembled media line, with at least one heating element wound around it is provided, only the media line, not the heating element is severed so that two sub-media lines are formed at the severing point, the at least one heating element is uncoiled in the region of the severing point of the media line at both ends of the sub-media line, a line connection device with a coupling portion for receiving a measuring device and with at least two connection sections on the two connection sections is connected to the two sub-media lines, and the at least one heating element is wound around the line connection device. Further developments of the invention are defined in the dependent claims.

Through this a multipart heatable media line, a method of producing this this and a line connection device for such are created with which problems in connection with icing of the medium flowing through the multipart heatable media line, including the line connection device, can be avoided through the providing the capability of heating of the coupling portion of the line connection device in which the measuring device is arranged. Through providing the capability of heating the line connection device, in particular in the region of the coupling portion in which the measuring device is arranged the medium flowing past the measuring element of the sensor element on the measuring element can be heated and thereby kept flowable. In addition, damage to the measuring device which could be caused by the freezing of the medium can also be prevented, such as, in particular, damage that could occur through the increase in volume occurring during the freezing of the medium as the area surrounding the measuring device can be heated through the provision of the ability to be heated. Through the use of the at least one heating element provided on the at least one sub-media line for the heating thereof or for heating the medium flowing through it, for coiling around and heating the coupling portion in which the measuring device is received, not only is a cost-effective solution possible, as only one or two heating elements are required, but connection points between individual heating elements, such as crimping points, can be saved could otherwise be damaged. It has proven to be particularly advantageous to let one and the same heating element extend along all sub-media lines and the line connecting device connecting them, including the at least one coupling portion in which the at least one measuring device is received. In doing so it is sufficient to provide only one single heating element which extends from one end of the one sub-media line via this, the line connection device and the second sub-media line, is deflected at the end of the second sub-media line and returned to the first sub-media line, coiling around the second sub-media line, the line connection device and the first sub-media line. Of course, more particularly two heating elements can be taken/wound from the first sub-media line, via this, the line connection device and the second sub-media line to the end thereof. Possible disruption along several heating elements joined to each other through unwanted separation of the connecting point which could possibly occur is effectively avoided as only one single heating element extends along the two sub-media lines as well as the connection device and the coupling portion receiving the measuring device.

In order to create such a multipart heatable media line, a pre-assembled media line wound with the at least one heating element is severed at a desired point. In doing so, only the pipe or tube-like media line is severed but not the heating element surrounding it. Through severing the media line two sub-media lines are produced. In the area of the severing point of the media line the heating element is wound back so that in the case of two heating elements or a heating element wound in one direction and back two loops are produced which are present in the region of the severing point of the media line, i.e. between the two sub-media lines and connecting these to each other. The line connection device, which is provided or subsequently provided with the coupling portion for receiving the measuring device, is then connected at its at least two connection ends to the sub-media lines. Depending on the required length of the sub-media lines and the length of the line connection device which connects these to each other, the one or two or all sub-media lines can be shortened accordingly in order to be of the required line length or in order not to increase, despite the insertion of the line connection device, the overall line length compared with the media line which is pre-assembled and initially cut to a first length, i.e. to bring the entire multipart heatable media line to the required length. The more media line that is cut out the more heating element is present. In this way, for example, the pitch of the winding can be retained. Shortening of the sub-media lines can, in particular, take place in the region of the severing point of the pre-assembled media line. This can also be advantageous if for winding the line connection device with the at least two heating elements a greater heating element length is required, which, however, would not be available through unwinding the heating elements from the sub-media lines around the severing point of the pre-assembled media line. Through further shortening of the sub-media lines and corresponding unwinding of the heating element(s) arranged thereon, the heating element length required for winding around the line connection element to be arranged between the sub-media lines can be made available.

During the connection of the line connection device to the at least two sub-media lines, the heating element(s) can be held out from the area of the connection ends of the line connection device and fixed in the removed position in order not to damage the heating element during the laser welding connection of the line connection device to the sub-media lines for example. The holding out of the at least one heating element or the resulting loop of the at least one heating element can take place through the use of a clamping device, pulling away by way of a mandrel or suchlike. After connecting the sub-media lines to the line connection device the heating element can be wound around the line connection device, above all in the area of the coupling portion in which the measuring device is received.

The measuring device can be provided for the measurement of parameters of the medium, such as, for example, the urea concentration in the case of an aqueous urea solution. Also measured in particular can be the density, the temperature, the viscosity of the medium, the dielectric constant or also the pressure of the medium within the sub-media lines and the line connection device. Other parameters of the medium can also be determined by the measuring device, depending on which type of sensor element the measuring device has and also of course depending which parameters are to be determined.

In order to prevent the at least on heating element from moving unintentionally along the line connection device and is thereby possibly no longer, or at least not optimally, being available for heating the region of the coupling portion receiving the measuring device, at least one fastening or fixing device for immobilising the at least one heating element for heating the coupling portion and/or the medium flowing in the region of the coupling portion is provided. Such a fastening or fixing device can be provided in the form, for example, of hooked or T-shaped elements which allow particularly simple fixation of the heating element on the outside of the line connection device. Other shapes of fastening and fixing devices are of course of also possible and the relevant shape can also be made dependent on the remaining configuration of the surface of the line connection device. The fastening or fixing means can therefore also be in the form of deflecting elements and/or strand guiding elements.

The measuring device comprises a housing in which the at least one sensor element is at least partially received. Instead of just one sensor element the measuring element can also have more than one sensor element, such as one sensor element for measuring a temperature and one sensor element for measuring a pressure. Furthermore, more than one measuring device, each with at least one sensor element, can be provided. The housing of the measuring element is preferably designed as a plug connector and can accordingly be inserted into the coupling portion of the line connection device without problems. In order to prevent the measuring device unintentionally becoming detached from the coupling portion of the line connection device the sensor element can be bonded to the housing and/or integrated into the housing through overmoulding. Through a bonded connection of the housing of the measuring device and the coupling portion it is no longer necessary to have to provide seals to prevent penetration of the medium between the measuring device and the or a coupling portion into which the measuring device is inserted. The housing of the measuring device can, in particular, consist of a laser-transparent material so that undetachable integration of the housing of the measuring device in the coupling portion of the line connection device by means of laser welding is possible. The sensor element, including the corresponding electronics usually required for its operation, can be included in the housing during its injection moulding. The sensor element and its electronics can be inserted into a corresponding mould and at least partially overmoulded with the material forming the housing of the measuring device. The sensor element and the sensor electronics can of course be included in the housing of the measuring device in a different way and manner, the latter also be formed in several parts, for example, and the sensor element inserted into a sealing element in the interior of the housing and holding element holding element on the housing interlocked in a corresponding counter bearing of the line connection device.

The housing of the measuring device can also be connected to the material of the coupling portion through, for example, adhesion, soldering or another bonding method, particularly also through friction welding or ultrasonic welding. Through such a bonded connection secure sealing of the housing of the measuring device in the coupling portion can be brought about. In this case sealing also means that penetration of medium from the interior of the line connection device past the housing of the measuring device to the outside can be reliably be prevented due to the bonding, i.e. structurally. However, subsequent loosening of the measuring device from the line connection device is no longer possible in this case. But, in contrast to WO 2013/130810 A1 it is not necessary to provide additional sealing by means of sealing elements to reliably prevent medium passing from the interior of the line connection device to the outside.

Advantageously the line connection device is made of a laser-transparent plastic material, in particular in the region of its connection ends and, possibly, in the coupling portion for receiving the measuring device so that the line connection device can be connected to the sub-media lines and the housing of the measuring device by means of laser welding. During the laser welding process the at least one heating element is beneficially, as has already been stated, held away from the region of the connection ends and the coupling portion of the line connection device, in particular by means of a fixing device for fixing the unwound heating element loop(s).

If a laser welding method for connecting the connection ends of the line connection device to the sub-media lines or the coupling portion to the housing of the measuring device is not envisaged, it is also not necessary for the material of the relevant joining partners or the laser connection device to be laser-transparent. If the at least one sub-media line is in the form of a hose line, it is, for example, advantageous for the relevant connection end of the line connection device to be designed with a mandrel profile in order to be able to flare on the hose line there and connect it to the line connection device.

For the thermally insulating sheathing of the line connection device at least one insulating device such as an encapsulation is provided. Depending on the design of the coupling portion or the measuring device inserted there, the encapsulation can be of a correspondingly matched shape. In particular it can have recesses for the sensor electronics and, of course, for the wiring leading thereto, such as electrical cables, which pass through the encapsulation, or a bulge or expanded chamber or housing section for receiving wiring in the form, for example, of a foil plate, which is connected to an evaluation unit, in particular a board with an evaluation unit for evaluating measurements recorded by the at least one sensor element. The at least one sensor element can be provided with a foil plate or be arranged on a foil plate or board of an evaluation unit or be connected thereto, more particularly though the or a foil plate. Through this a particularly ordered connection of the at least one sensor element with the at least one evaluation unit is possible, particularly when this is arranged on a board. Advantageously an outer encapsulation, which also receives the foil plate, due to its usually large bending radius, for example, is spatially expanded there or provided with an expanded chamber in order to be able to receive the foil plate better. In particular, the at least one sensor element with the board of an evaluation unit, which evaluates measurements recorded by the at least one sensor element, can be connected by at least one foil element to at least one line arranged thereon. Through the provision of such a foil element for connecting sensor element(s) and the board of the evaluation unit these can be connected to each other in a housing or housing section of the line connection device particularly well and without complex wiring or crimp connections.

The electrical supply lines of the at least one sensor element, in particular a pressure sensor element and a temperature sensor element, can be combined together with the electrical supply line(s) or the heating element(s) into a common electrical plug for connecting to a supply voltage source. Naturally two electrical plugs can also be provided, one for the electrical supply lines of the heating elements and one for the electrical supply lines of the at least one sensor element and, in particular, at least one signal line. Both electrical plugs can also be arranged in a housing. It is also possible, in order to save material and weight, to provide a common earth line for the at least one sensor element and electrical heating elements as well as at least one possibly provided signal line. Such a common earth line for sensor element(s) and electrical heating elements as well as any provided signal line(s) can also be used if at least one sensor element is provided in the media line. It is also possible to provide a common earth line and common electrical supply line for the at least one sensor element and the heating elements and possibly provided signal line(s). Here, a sensor element, such as a pressure sensor element, is provided with an extended operating voltage range, from 8 to 32 V for example. The connections, in particular crimp connections between the electrical supply lines and the heating elements, sensor lines, signal lines also advantageously have a multiple, more particularly, triple stop.

Instead of a continuous insulating device on the outside, such as an encapsulation, at least one insulating and/or protecting encapsulation of at least the area which surrounds the measuring device received in the coupling portion, or is envisaged for the measuring device can be provided. The insulating encapsulation can be connected with at a least two cladding tubes or sheaths for the external insulating encapsulation of the sub-media lines in the region of the coupling portion receiving the measuring device. At the end the encapsulation is advantageously sealed vis-à-vis the cladding tubes, through the provision, for example, of protruding elements which engage with the cladding tubes in a sealing manner to ensure good insulation in every case.

In the region of the coupling portion an expansion volume can also be provided into which medium that is freezing can expand during the increase in volume due to freezing so as not to damage the sensor element of the measuring device during the freezing process.

The coupling portion for receiving the measuring device and/or a transition area adjacent thereto between the connection ends of the line connection device, in which the coupling portion is arranged, can be made of a conductive material, such as a thermally conductive plastic material. Conductive here means conductivity in terms of the parameter of the medium to be recorded by the measuring device, i.e. thermal conductivity in the case of determining a temperature. The conductive material can convey the parameter of the medium that is to be recorded by the measuring device. If the sensor element of the measuring device is intended for recording temperature, the provision of thermally conductive material is advantageous as, through this, without direct media contact, the medium temperature can via the thermally conductive material be brought close to the sensor element of the measuring device. It is also possible to produce the material of the housing of the measuring device that surrounds the sensor element of a thermally conductive material so that even better heat transporting of the medium in the direction of the sensor element is possible through the housing of the measuring device. It is also possible for the sensor element itself to be at least partially covered with a conductive, such as thermally conductive material, so that the material of the housing of the measuring device or the surroundings of the sensor element does/do not necessarily have to be conductive. If through the sensor element a parameter other than the temperature of the medium is to be recorded it is not necessary to produce the housing of the measuring device and/or the coupling portion of the line connection device of a thermally conductive material or to design at least parts of this to be thermally conductive.

It is particularly advantageous if, in the case of temperature recording, the conductive material, i.e. the thermally conductive material, is also electrically insulating. In addition, both the conductive, more particularly thermally conductive material, and the non-conductive material, e.g. for use with cooling water as the medium, are hydrolysis stabilised. A suitable material is, for example, PA66 supplied by the company EPIC Polymers Ltd under the name STAR-THERM® W A-2 HT, which is thermoconductively doped, high heat stabilised and electrically insulating. At 23° C. this material has a tensile strength of 145 MPa or a tensile e-module of 12,500 MPa in the freshly injected state. Alternatively, materials such as PA12, PA11 or PPA (polyphthalamide), which are each thermoconductively doped, can be used as thermally conductive material. Other examples of usable thermally conductive materials are, for example, the thermally and electrically conductive PA66 910/30.1 TOE 2 supplied under the name ALCOM by the company Albis Plastic GmbH, Hamburg or ALCOM PA 66 910/30.2 TCD2, ALCOM PA66 910/30.3 TCD1, ALCOM PA12 920/30.4 TCD1 as thermally conductive and electrically insulating polymer materials. Particularly preferably ALCON PBT 700/30.2 TCD2 can be used, which has a tensile module of 8,900 MPa and a thermal conductivity of 2 W/m*K. In principle, as basic polymers which are thermoconductively doped and are freely compoundable, polymers such as PA (polyamide), PP (polyphenylene), PBT (polybutyl enterephthalate), PE (polyethylene), TPE (thermoplastic elastomer) or PPS (polyphenylene sulphide) can be used. These basic polymers can be used without thermoconductive doping, possible reinforced with glass fibre in order to exhibit the required mechanical strength, as injection moulding material for the housing of the connection device. In each case, in thermally conductive material, any provided glass fibre portion is much lower than in the surrounding material of the housing of the connection device. Preferably the glass fibre portion in the region of the thermally conductive material is zero.

Through the use of a housing encompassing the sensor element it can always be ensured that the sensor element does not come into direct contact with the medium and thereby is not attacked and damaged by the medium. Furthermore, through the provision of the measuring device in the form of a plug-type connection or the provision of a housing in which the sensor element is at least partially received, particularly simple assembly of the sensor element or the measuring device in the line connection device or in the coupling portion thereof is envisaged.

In the event that the housing of the at least one sensor element is created by overmoulding, in order to protect the sensor element from damage during the overmoulding with conductive, such as thermally conductive material, it is also advantageous to keep the process pressure during the overmoulding of the sensor element with (thermally) conductive material lower than the process pressure during the injection moulding of the housing of the line connection device. Particularly advantageously the internal tool pressure during overmoulding of the sensor element is less than 500 bars, for example 150 to 250 bars. The process pressure during the injection moulding of the housing of the line connection device is selected to be higher, for example 500 to 1000 bars, as for the production of the sometimes very complex contour, in particular of a mandrel profile, high pressures are required in the region of the connection sections of the housing of the line connection device in order to be able to produce these. However, high pressures could damage the sensor element during overmoulding so that for this the cited considerably lower pressures are used. In particular, the ratio of the injection pressure during the injection moulding of the housing to the pressure during overmoulding of the sensor element is 2 to 4.

It is particularly advantageous to arrange the coupling portion and thus the measuring device in relation to the line connection device in a central or middle region relative to the longitudinal extent of the line connection device, whereby this applies both in the case of a straight and also an angular line connection device. In an angularly designed line connection device the arrangement in the transition area between the connection ends can be either flush or at an angle to both. When arranging in a straight line connection device the measuring device or the coupling portion receiving this is usually at an angle to both in the transition area from one connection end to the other.

When carrying out measurements in fluid and frozen media, differences in measurements can occur which can be used for ice monitoring, i.e. in order to determine whether at least some of the sub-media lines or the multipart heatable media line still contain(s) frozen media.

The line connection element provided with the measuring device is in particular suitable for multipart heatable media lines which are designed as suction lines, but for return lines and pressures lines used for the transporting, for example of aqueous urea solution (AdBlue®) in SCR systems. Here it is possible to record medium or fluid parameters without having to provide additional fluidic separation points and independently of the geometry of, for example, a vehicle tank or a tank emitter. By way of this, for example, thermal bridges, thawing limits heating problems can be determined and tightness tests carried out. In cases in which no tank emitters which can be placed in the proximity of a commercially available tank base are used it is also very advantageous to provide such multipart heatable media lines via which or the measuring devices in their line connection device the required parameters of the medium can be recorded. For example, the urea concentration can be continuously measured via infrared or photocells. The measuring device can also be designed in such a way that it completely encompasses the medium, wherein infrared light diodes and photo diodes or suchlike are arranged opposite each other which shine through the medium and thereby record the required measurements or parameters.

Also advantageously, at least one device for keeping frozen medium away from the at least one sensor element of the at least one measuring device in the line connection device is or can be provided in order to prevent damage to the at least one sensor element through frozen medium, more particularly this device being permanently integrated into the line connection device or inserted as a separate element into the line connection device, in particular into a connection section of the line connection device. Permanently integrated is taken to mean the non-detachable holding of the keeping away device in the interior of the line connection device, i.e. being formed in one piece with the wall thereof adjacent to the keeping away device, or a bonded connection thereto. In each of these cases non-detachability of the keeping away device and remaining material of the line connection device is created. As an alternative to non-detachable attachment, the insertion of the keeping away device, designed as an additional or separate element, into the line connection device or into a connection section thereof is possible. Fundamentally the keeping away device is detachably received in the line connection device here. Through the keeping away device it is possible, even in the case of at least partial icing of the medium within the media line(s) which is/are connected to the line connection device, to keep the frozen medium from penetrating into the medium channel in the interior of the line connection device and to prevent it from damaging, more particularly bending, kinking or even breaking off, the at least one sensor element protruding into the medium channel there or making it unusable. When the medium freezes its volume increases so that the ice forming in the media line expands in comparison with the state of the unfrozen medium and pushes into the line connection device. Through this, without the keeping away device, damage to the at least one sensor element of the at least one measuring device protruding into the medium channel could occur. This can be prevented by the provision of the keeping away device as this keeps the forming ice from penetrating into the area of the at least one sensor element in the interior of the line connection device. The keeping away device is therefore a protective device for the sensor element. Advantageously it is provided in the vicinity or adjacent to the at least one sensor element in order to protect this from damage, but at the same time to leave a sufficiently large space for the medium to expand during freezing.

In particular the keeping away device can be inserted into or permanently integrated in a connection section of the line connection device. Advantageously in each of these cases the keeping away device can be arranged or be supported on a spur in the interior of the connection section or in the medium channel in the interior of the line connection device in order to be able to provide particularly good resistance to the pressure exerted by the ice being formed by the freezing medium and not to be displaced when ice formation occurs.

BRIEF DESCRIPTION OF THE DRAWINGS

In order to explain the invention in more detail, examples of embodiment thereof are describe in more detail below with aid of the drawings.

In these:

FIG. 23 shows a perspective view of a further form of embodiment of multipart heatable media line according to the invention with a straight line connection device and a measuring device received therein, wherein the line connection device has laterally projecting T-shaped fixation elements for fastening the heating elements, FIG. 24 shows a view from above of the multipart heatable media line according to FIG. 23, FIG. 25 to FIG. 29 show perspective views of various variant of embodiment of line connection device according to the invention for connecting two sub-media line and for receiving a measuring device.

FIG. 42 shows a lateral cross-sectional view of a further variant of embodiment of line connection device according to the invention similar to the one shown in FIGS. 41 and 41a containing a permanently integrated keeping away device, FIGS. 42a and 42b show detailed views of the arrangement area of the keeping away device, on the one had as a side view corresponding to FIG. 41 and on the other hand as a front view (FIG. 42b), FIG. 43 shows a lateral cross-section of the line connection device according to FIG. 41 containing the keeping away device inserted as an additional component, and FIG. 43a ad 43b show two detailed view of the arrangement area of the keeping way device, on the one hand as a lateral cross-sectional view corresponding to FIG. 43 and on the other hand as a front view (FIG. 43b).

DETAILED DESCRIPTION OF THE INVENTION

Figure 1:
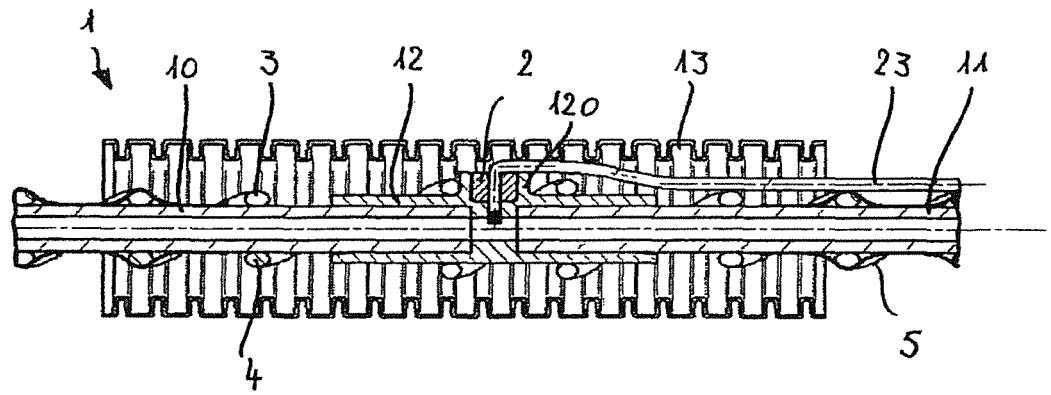
FIG. 1 shows a longitudinal section through a multipart heatable media line with a line connection device and measuring device according to the invention.

Shown in FIGS. 1 to 4 is a first embodiment variant of a multipart heatable media line 1, comprising two sub media lines 10, 11, a line connection device 12 connecting these, a measuring device 3 inserted therein and a sheath, preferable a cladding tube 13 which externally covers and thermally insulates all said components. The sheath can, as shown, be a corrugated tube, a smooth tube, a foam sheath or other form of cladding tube which serves to thermally insulate the individual components of the multipart heatable media line. Wound around the two sub-media lines 10, 11, as well as the line connection device 12 which connects these, are two heating element 2, 4 which make it possible to heat both the sub-media lines 10, 11 and also the line connection device 12. Both heating elements 3, 4 extend along both the first sub-media line 10 and also the second sub-media line as well as the line connection device 12, in particular around its coupling portion 120 in which the measuring device 2 is inserted.

Figure 4:
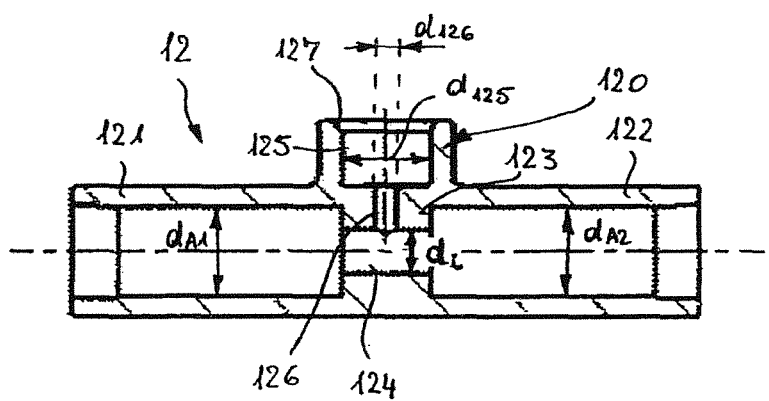
FIG. 4 shows a longitudinal section of the line connection device according to FIG. 1, FIG. 5 to FIG. 10 show steps for producing the multipart heatable media line according to FIG. 1.

The line connection device 12 is shown in detail in FIG. 4. It has two connection sections 121, 122 for connection to the sub-media lines 10, 11 and approximately midway between these, in a transition area from the one connection section to the other, i.e. centrally on the line connection device 12, the coupling portion 120. In the region of the coupling portion 120 the wall thickness of the wall of the line connection device 12 is greater, as a result of which the inner diameter $d_i$ of the throughflow channel 124 provided there in the interior of the line connection device 12 is smaller than the respective inner diameter $d_{A1}$, $d_{A2}$ of the connection sections 121, 122. The inner diameter $d_i$ of the throughflow channel 124 is matched to the inner diameter $d_{10}$ and $d_{11}$ of the two sub-media lines 10, 11, wherein $d_i=d_{10}=d_{11}$. This can be seen in FIG. 2. The difference of inner diameter $d_{10}$ and $d_{11}$ of the two sub-media lines 10, 11 in relation to the inner diameters $d_{A1}$ and $d_{A2}$ of the line connection device 12 in the area of the two connection sections 121, 122 is defined by the relevant wall thickness $w_{10}$, $w_{11}$ of the walls 110, 11 of the two sub-media lines 10, 11 which can also be seen in FIG. 2.

Figure 3:
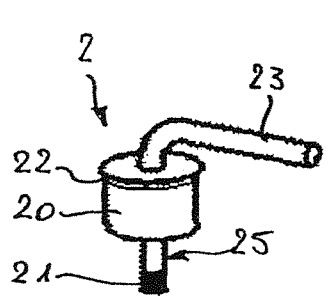
FIG. 3 shows a perspective view of a measuring device according the invention of the multipart heatable media line according to FIG. 1.

The coupling portion 120 has a section 125 with a larger inner diameter $d_{125}$ and in the wall 123 a section 126 with a smaller inner diameter $d_{126}$. The section 126 extends from the section 125 into the throughflow channel 124. The section 125 with the larger diameter is for the insertion of a housing 20 of the measuring device, whereas the section 126 with the smaller diameter is for the insertion of a contact section 21 of the sensor element 25 of the measuring device 2 accordingly provided with a smaller outer diameter, as shown, for example, in a perspective view in FIG. 3. At the end the coupling portion 120 has an inner chamfer 127 which is formed in a mirror-inverted manner to a chamfered end section 22 of the housing 20 of the measuring device 2, which can also be seen in FIG. 3. The measuring device 2 is also provided with a delivery line, possibly a data line, for delivering the recorded data to an external evaluation unit (which is not shown here), as is also indicated in FIG. 3 with reference number 23.

Figure 30:
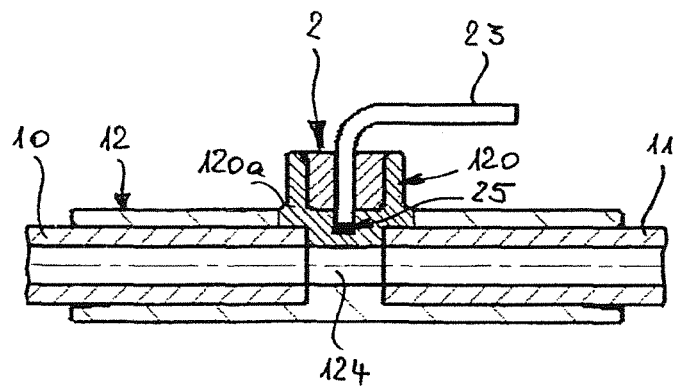
FIG. 30 shows a longitudinal section of another form of embodiment of a multipart heatable media line according to the invention wherein the line connection device partly consists of thermally conductive material.

After insertion of the measuring device 2 or the housing 20 of the measuring device 2 into the coupling portion 120 of the line connection device 12 or the section 125 there the contact section 21 is taken up in the section 126 of the line connection device 12 and with its front end 24 projects into the throughflow channel 124 and thus into the medium that can flow through there. In principle it is also possible to make the contact section 126 shorter so that it does not project into the throughflow channel 124 but ends approximately flush with its wall 123 or in the wall 123 as shown in FIG. 30. In the later variant of embodiment the coupling portion 120 is provided with, doped with or comprises a thermally conductive material 120a. In FIG. 30 the thermally conductive material is indicated by narrower hatching. By providing the thermally conductive material 120a good thermal conduction to the sensor element 25 of the measuring device 2 is possible without this coming into contact with the medium flowing through the throughflow channel 124.

The housing 20 of the measuring device 2 is preferably inserted in bonded manner into the line connection device 12 or its section 125, for example through adhesion, welding, soldering, in particular through friction welding, ultrasonic welding or laser welding. In the case of laser welding the coupling portion 120 in particular, at least in the region of its section 125, is made of a laser transparent material so that laser welding is made possible thereby. Advantageously the sub-media lines 10, 11 are connected in a bonded manner to the line connection device 12 in the region of its connection sections 121, 122 into which they are inserted, more particularly also through laser welding. In this case it is particularly advantageous if the line connection device, at least in the region of its connection sections 121, 122, is made of a laser transparent material in order to make such laser welding possible.

Figure 2:
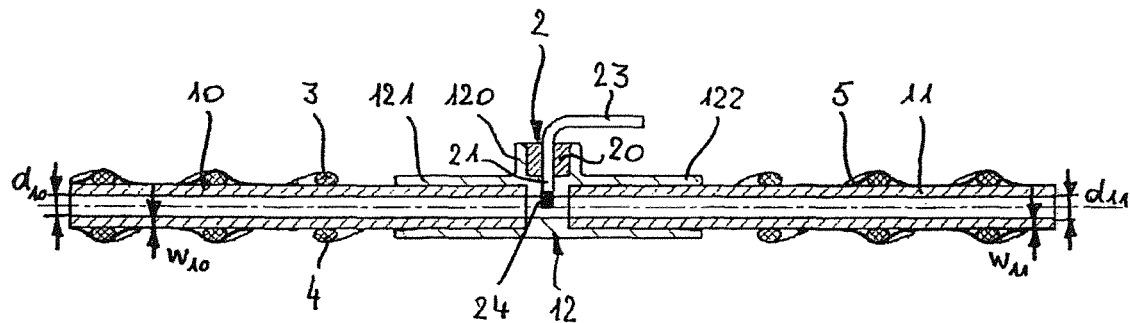
FIG. 2 shows a longitudinal section through a multipart heatable media line according to FIG. 1 but without insulating corrugated pipe and with heating elements unwound from the line connection device.

The heating elements 3, 4 are, as can be seen especially well in FIGS. 1 and 2, attached on the outer side of the two sub-media lines by means of a fixing tape 5, for example an adhesive tape, fabric tape or fabric adhesive tape. Instead of two heating elements 3, 4 only one heating element can also be provided which is deflected at the end of one of the two sub-media lines 10, 11 and returned. In doing so this is doubled and initially taken in one direction to the outer end of one sub-media line and, after deflection there, to the outer end of the other sub-media line while being wound around these and the line connection device 12.

Figure 5:
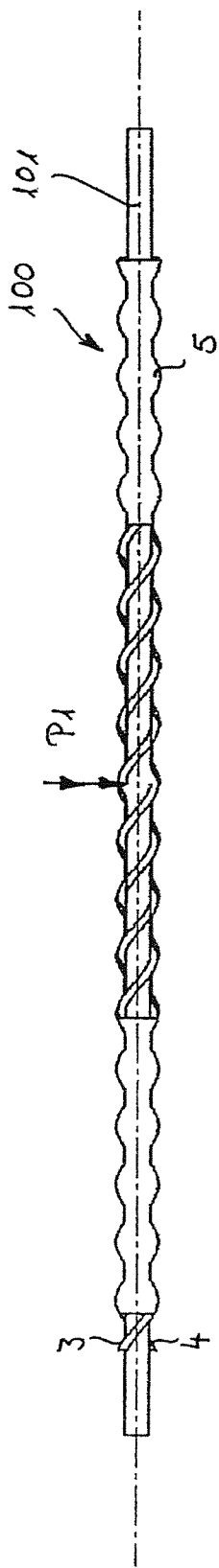
Figure 6:
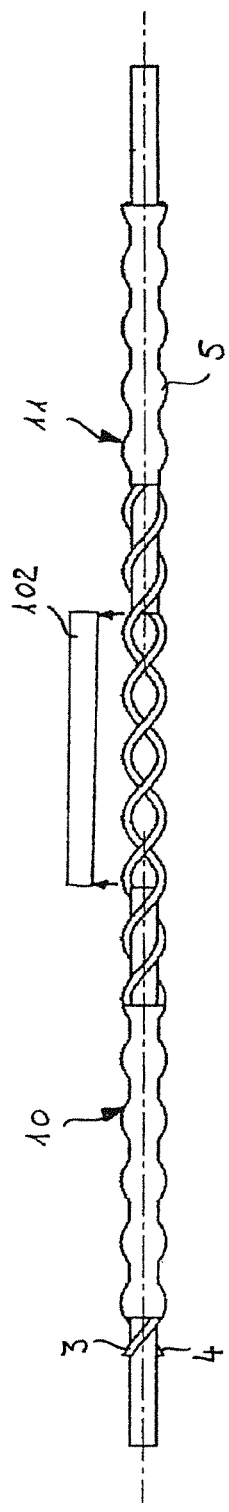
Figure 7:
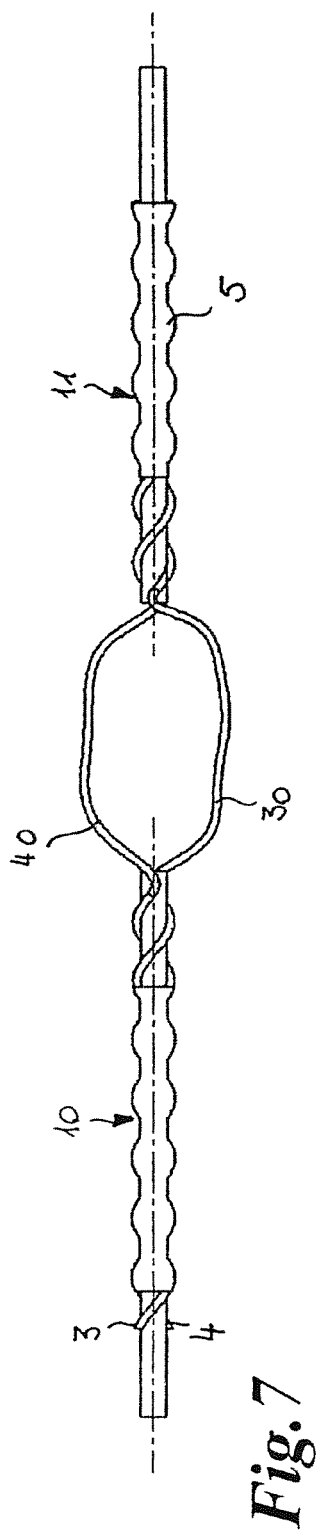

Shown in FIGS. 5 to 10 are the individual steps for producing the multipart heatable media line 1 according to FIGS. 1 and 2. Here, a prefabricated or pre-assembled media line 100 around which the two heating element 3, 4 are wound, is severed at a suitable point (see arrow P1 in FIG. 5). However, only the tubular media line 101 itself, but not the heating elements 3, 4 are severed, as can be seen in particular in FIG. 6. More particularly a section 102 is separated out of the pre-assembled media line 100 as indicated in FIG. 6. This corresponds to the length of the line connection device 12 which is then inserted instead at the ends of the sub-media lines 10, 11. After severing the prefabricated media line 100 the two sub-media lines 10, 11 result. The two heating elements 3, 4 are wound back and are available as loops 30, 40, as indicated in FIG. 7, for subsequent winding around the line connection device 12.

If the entire preassembled media line 100 is initially surrounded by fixing tape 5, this can be removed in a partial section in which the heatable media line 100 is to be severed, as also shown in FIG. 5. However, the fixing tape 5 may only be provided in one partial section or several partial sections of the pre-assembled media line 100, so that in the sections arranged between them, in which no wrapping with fixing tape 5 is present, severing of the pre-fabricated media line 100 is easily possible without prior removal of the tape.

As shown in FIG. 8 the line connection device 12 can already be pre-assembled with the measuring device 2. Through this it is subsequently no longer necessary to insert the measuring device into the line connection device 12 and connect this thereto in a bonded manner. The measuring device 12 can also be initially inserted into the coupling portion 120 of the line connection device 12 and a bonded connection then produced, for example through laser welding, together with the bonded connection of the two sub-media lines 10, 11 to the line connection device 12, insofar as all the components are to be connected through laser welding. To connect the line connection device 12 with the sub-media lines 10, lithe exposed ends 112, 113 of the two sub-media lines 10, 11 are inserted into the connection sections 121, 122 so that the ends 112, 113 are now only at a short distance a from each other which approximately corresponds to the length of the throughflow channel 124, as indicated in FIG. 8.

After connecting the sub-media lines 10, 11 to the line connection device 12 the intermediate state shown in FIG. 9 is produced in which the two loops 30, 40 of the two heating elements 3, 4 are still held at a distance from the line connection device 12 in order not to disrupt laser welding of the line connection device 12 to the sub-media lines 10, 11 and, possibly, also the measuring device 2 or its housing 20 to the line connection device 12 and thereby not to damage the heating elements. Holding away or fixing the heating element loops 30, 40 in a position removed from the line connection device 12 can take place by way of clips, a mandrel or other aids. However, this is not shown in FIG. 9.

After connecting the sub-media lines 10, 11 and the measuring device 2 with the line connection device 12 the two heating elements 3, 4 are wound around the outside of the line connecting element 12, as can be seen in FIG. 10, so that the embodiment of the multipart heatable media line 1 shown in FIGS. 1 and 3 results. The multipart heatable media line can subsequently be encompassed by the corrugated or cladding tube 13 which is shown in FIG. 1.

In FIGS. 23, 24, 25 to 29, 31 to 36 alternative embodiment variants of line connection devices are shown, wherein in each case these are designed as straight line connection devices. In contrast to the embodiment variant shown in FIG. 4, the line connection device 140 according to FIG. 23, 24 has externally projecting T-shaped fixing elements 141 which serve to deflect and fix the two heating elements 3, 4 in the region of the coupling section 142. This ensures that the throughflow channel in the interior or the line connection device 140 in the region of the coupling portion 142, i.e. in the region in which the measuring device 2 is arranged, is always also heated when the multipart heatable media line 1 is being heated in order to keep the medium flowing through there fluid and thus flowable and not to falsify the measurements of the measuring device 3 or even make measurement impossible, or to rapidly make measurement possible again when, for example, after longer stoppage of the vehicle at low ambient temperatures the frozen medium there is quickly thawed out again.

Figure 27:
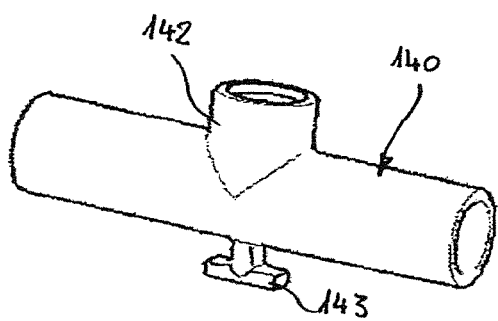

Instead of arranging the fixing elements 141 on both sides, a T-shaped fixing element 143 can also be arranged diametrically opposite the coupling portion 142 on the outside of the wall of the line connection device 140, as indicated in FIG. 27. Another shape of the fixing element is of course possible, such as a hook shape or also the shape of the deflecting element at which at least one of the two heating elements 3, 4 can be deflected, so that in this region particularly good heating is possible. The fixing elements are preferably arranged in the region of the coupling portion 142 or in the region of the throughflow section in the interior of the line connection device in which the measuring device 2 can intervene for measuring.

Figure 28:
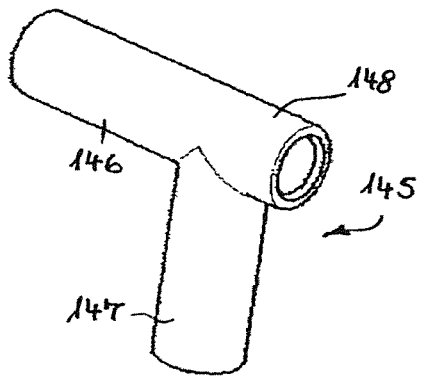
Figure 29:
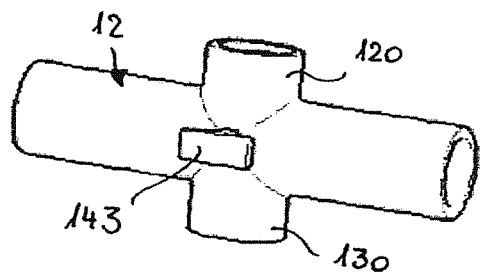

As can also be seen in FIGS. 25 to 29, the line connection device can be of a large variety of forms, wherein, for example two measuring devices can also be inserted into two coupling portions 120, 130 as indicated in the form of embodiment according to FIG. 29. It is also possible to connect not only two sub-media lines through the line connection device 12, but, for example, also three sub-media lines, producing an embodiment variant such as the line connection device according to FIG. 29. For deflecting and fastening the heating elements 3, 4 this embodiment variant also has at least one T-shaped fixing element 143 on the outside on the wall of the line connection device 140.

Figure 25:
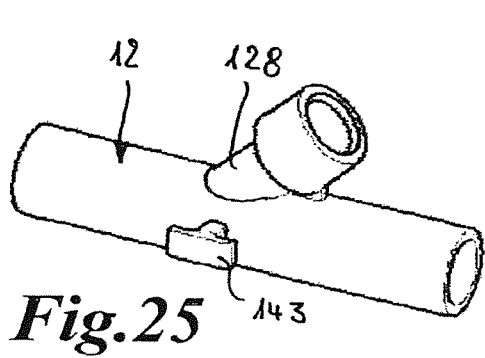
Figure 31:
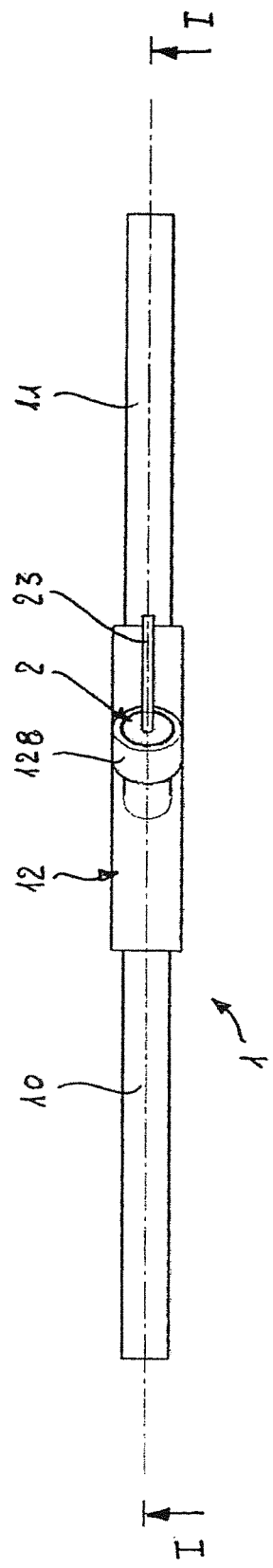
FIG. 31 shows a view from above of a multipart heatable media line according to the invention comprising two media lines and one line connection device according to FIG. 25.
Figure 32:
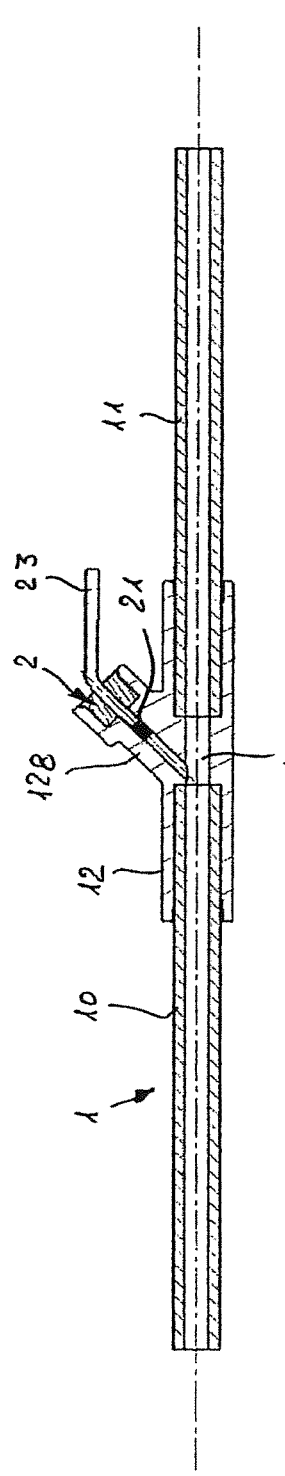
FIG. 32 shows a longitudinal section along line I-I of the multipart heatable media line according to FIG. 31.
Figure 33:
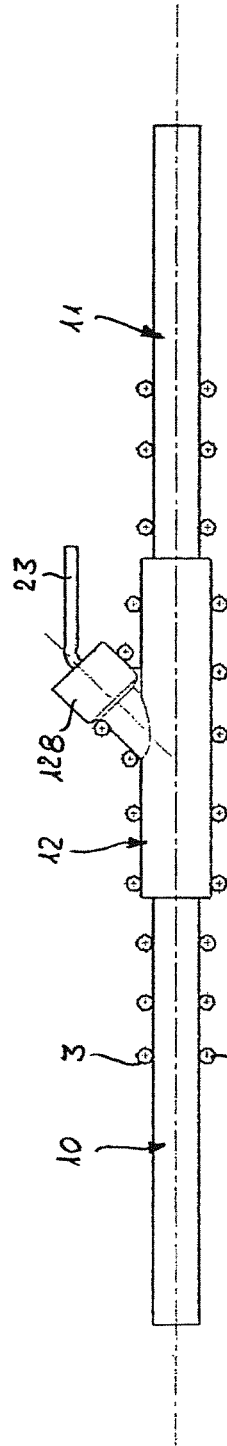
FIG. 33 shows a side view of the multipart heatable media line according to FIG. 31 with heating elements arranged thereon.

Additionally, the coupling portion can also be provided at an angle deviating from 90° to the longitudinal extent of the two coupling portions 121, 122 of the line connection device, as shown in the embodiment variant according to FIG. 25 and in FIGS. 31 and 33, wherein the measuring device 2 is received in coupling section 128. The heating elements 3, 4 can again be deflected and fixed on T-shaped fixing elements 143 provided on the outside on the wall of the line connection device 140 (see FIG. 25). In the form of embodiment of the line connection device 12 shown in FIGS. 31 to 33 the contact area 21 does not protrude into the throughflow channel 124 (FIG. 32) but ends at distance therefrom in section 126. However, heating of the coupling portion 128 is also envisaged, as is indicated in FIG. 33.

Figure 26:
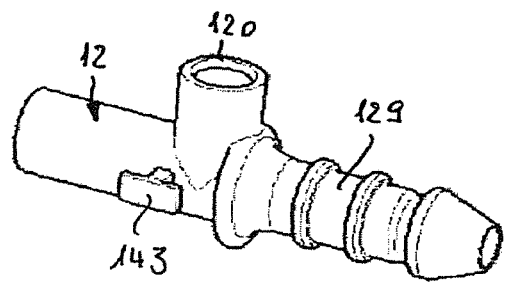
Figure 34:
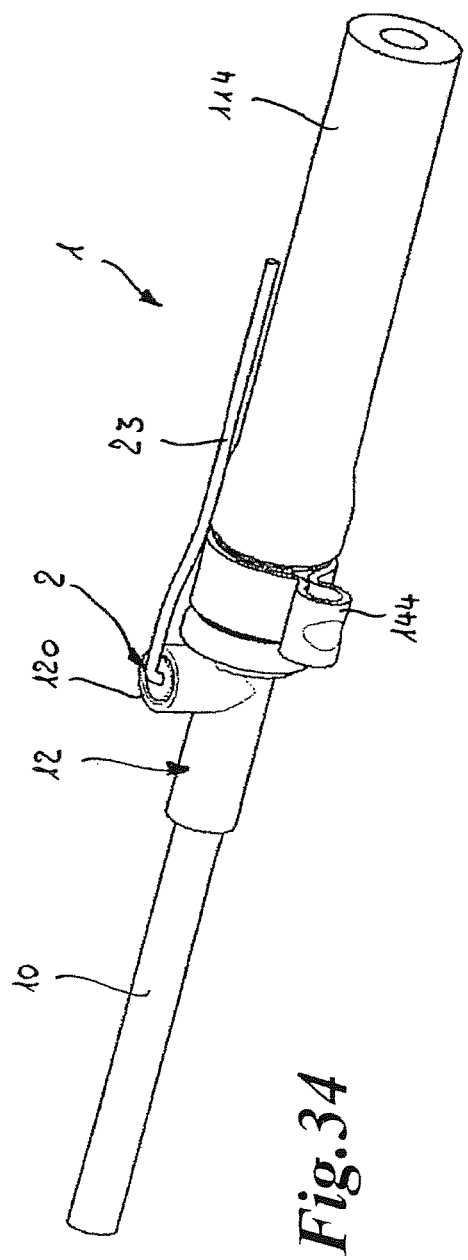
FIG. 34 shows a perspective view of a further form of embodiment of a multipart heatable media line according to the invention, comprising two sub-media lines and a line connection device according to FIG. 26 into which a measuring device is inserted.
Figure 35:
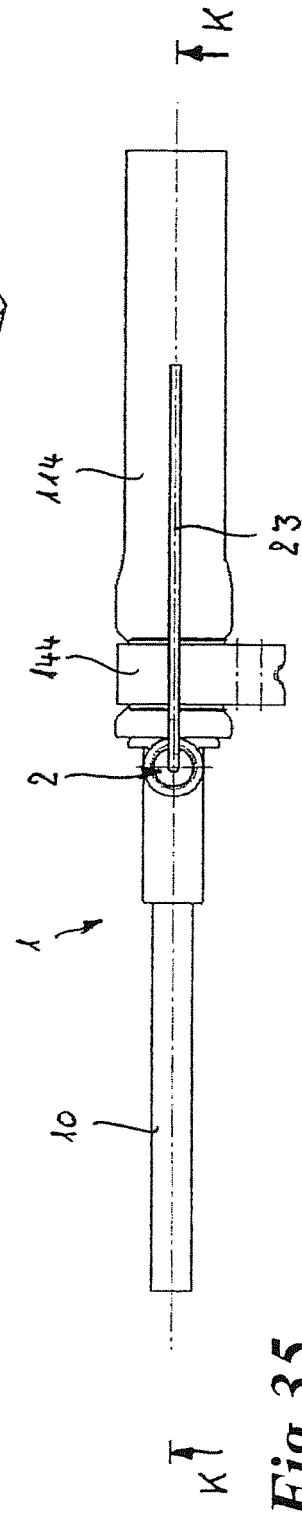
FIG. 35 shows a view from above of the multipart heatable media line according to FIG. 34.
Figure 36:
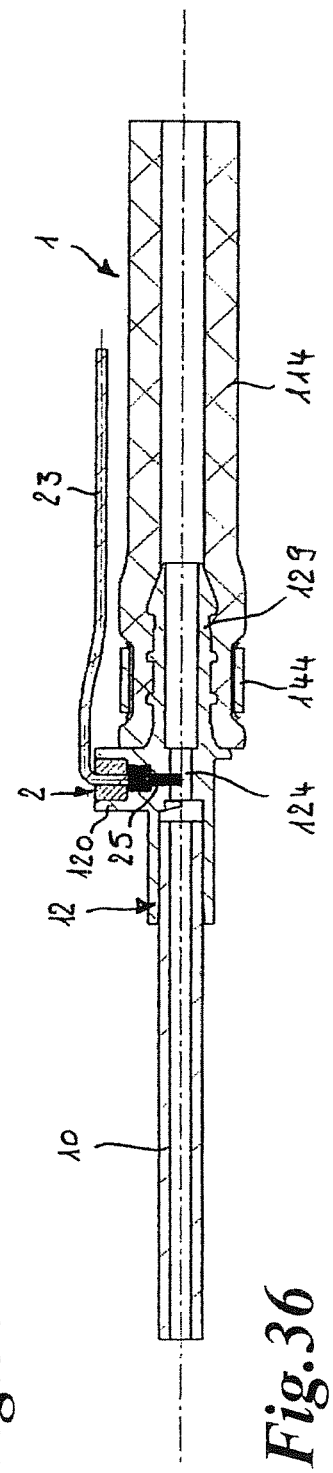
FIG. 36 shows a longitudinal section along line K-K of the multipart heatable media line according to FIG. 35.

If one of the two sub-media lines is designed in the form of a hose line 114, as indicated in FIGS. 34 to 36, a connection section with an external mandrel profile can be provided as shown in FIGS. 26 and 36.

In order to provide a particularly secure and good connection of the connection section 129 with the hose line 114, a clamping element 144 is arranged on the outside around the hose line 114 in the region of the mandrel profile 129. The other sub-media line 10 is pipe-like, i.e. not in the form of a hose line, and, in turn, is securely connected to the line connection device 12 by means of adhesion, laser welding or another connection possibility. In this embodiment variant too T-shaped fixing elements 143 are again provided on the outside on the wall of the line connection device 140 in order to be able to deflect and fasten the heating elements 3, 4.

It is also possible, as indicated in FIG. 28, to provide an angle connector 145 as the line connection device, wherein the measuring device 2 can be arranged in the transition area between the two connection sections 146, 147 of the angular line connection device 145 in a coupling portion 148. This is also shown in FIGS. 11 to 13 and 14 to 16.

Figure 11:
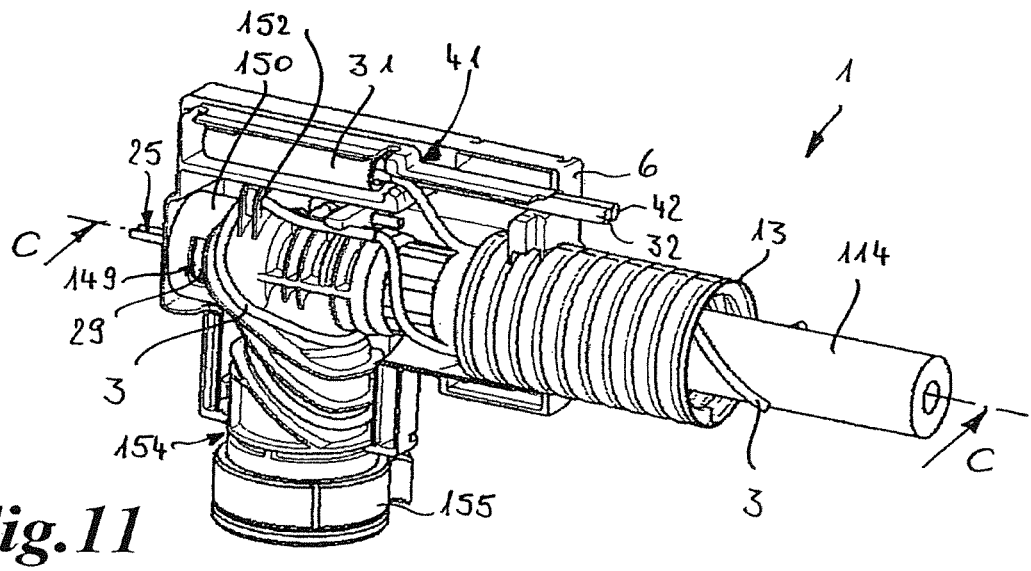
FIG. 11 shows a perspective view of a second form of embodiment of angular line connection device according to the invention for connection two sub-media lines with a measuring device received in the line connection device.
Figure 12:
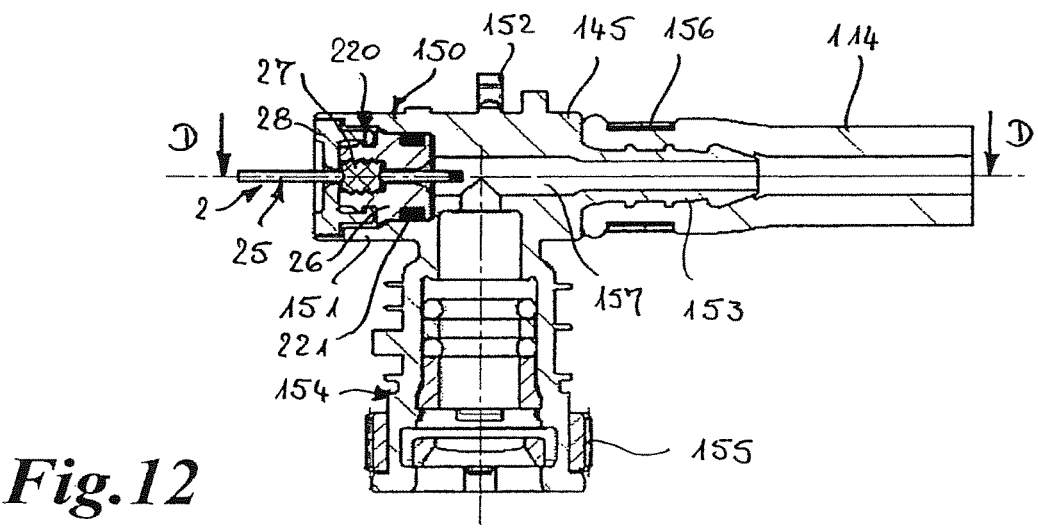
FIG. 12 shows a longitudinal section of the line connection device according to FIG. 11 along the line C-C.
Figure 13:
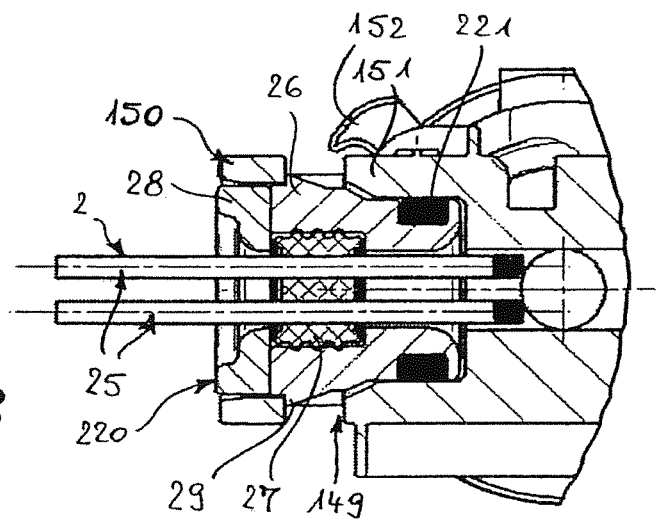
FIG. 13 shows a detailed view of the line connection device according to FIG. 12 in the region of the connection section in which the measuring device is received, in a section along line D-D wherein the measuring device comprises two sensor elements.

As shown in FIGS. 11 to 13, the measuring device according to this embodiment variant is not designed though the injection of a sensor element 25 into the housing 20, as indicated in FIG. 36, but through the provision of a multipart housing 220 that comprises an outer section 26 which externally encompasses the two sensor elements 25, an inner sealing element 27 which serves to seal the housing to the outside and an outer holding element 28. The holding element 28 of the housing 220 interlocks with the housing section 26 as can be seen in FIG. 12. In its area inserted into the interior of the housing 150, the housing section 26 has a circumferential sealing element 221 which permits external sealing in the plug opening in the interior of the coupling section 151. As can also be seen in FIG. 11 an external encapsulation 6 of the line connection device 145 is provided, through which the sensor elements 25 or electrical cables thereof protrude. In the external encapsulation 6, which serves to thermally insulate the line connection device, corresponding openings for the sensor elements of the electrical cables thereof can be provided. Also arranged in the encapsulation 6 are crimp connections 31, 41 of the heating elements 3, 4 with their electrical cables 32, 42.

According to this embodiment variant two sensor elements 25 are thus provided which can record different parameters of the medium, such as pressure and temperature for example. More than two sensor elements 25 which can record different parameters of the medium can of course also be provided. Through this, condition measurements in the case of a frozen medium are possible for instance. However, sensor elements can also be provided which record the same parameter of the medium through which, for example, a reference measurement can take place.

In the region of the coupling portion 151 in which the housing 220 of the measuring device is inserted, the housing of the line connection device 145 comprises a fixing element 152 in the form of a hook on which the heating element 3 is attached in order to be able to also provide particularly good heating in the region of the coupling portion 151 of the in line connection device 145.

As can also be seen in FIG. 12, one connection section 153 is in the form of a mandrel profile and the other connection section 154 is in the form of a coupling portion into which a plug section of a corresponding sub-media line can be inserted, which can thereafter be retained in its position by means of a holding element 155 also provided there. The hose line 114 can in turn additionally be held on the mandrel profile 153 by a clamping element 156.

Figure 14:
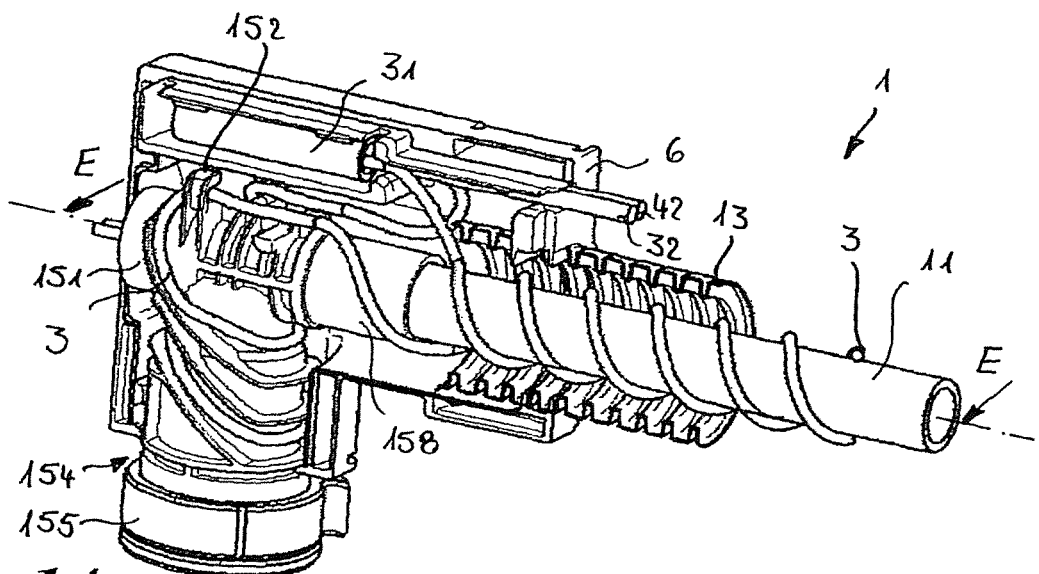
FIG. 14 shows a perspective view of a further form of embodiment of an angular line connection device according to the invention for connecting two sub-media lines, with a measuring device received in the line connection device.
Figure 15:
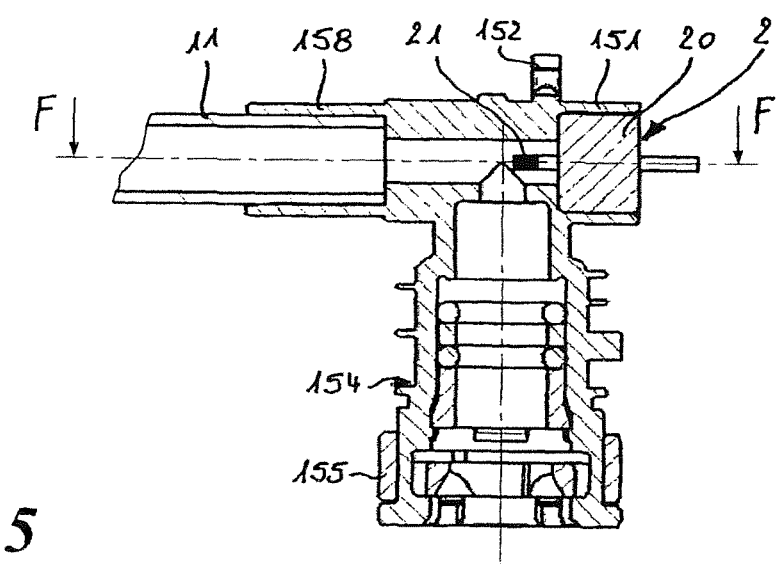
FIG. 15 shows a longitudinal section of the line connection device according to FIG. 14 alone line E-E.
Figure 16:
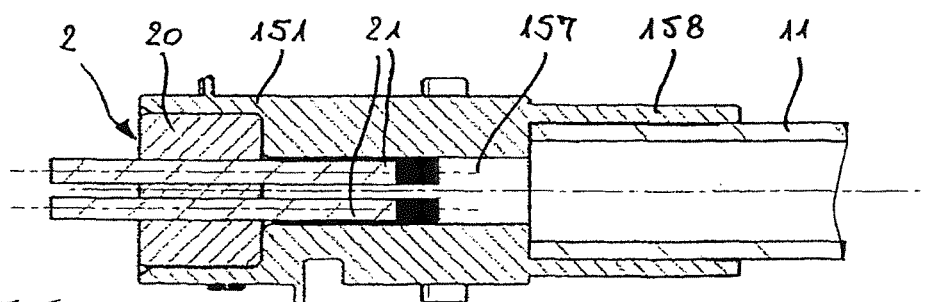
FIG. 16 shows a cross-section along line F-F of the line connection device according to FIG. 15 in the region of the connection section with a measuring device received therein, wherein the measuring device comprises two sensor elements.

The embodiment variant shown in FIGS. 14 to 16 only differs from the one shown in FIGS. 11 to 13 in that according to this embodiment variant the sensor elements are overmoulded by the housing 20 and this is inserted into the coupling portion 151 of the line connection device 145 by means of laser welding, adhesion or soldering, for example. In the embodiment variant according to FIGS. 11 to 16 the coupling portions 151 for receiving the measuring device 2 are each arranged in the transition area between the two connection sections for receiving the sub-media lines flush with the one connection section 158 for receiving the sub-media line 11 or 153 for receiving the hose line 114. According to FIG. 16 the contact sections 21 of the sensor element 25 are arranged in an inner through or throughflow channel 157.

In FIGS. 17 to 19 and 20 to 22 line connection devices 12 of straight design are shown in each of which one connection section 160 in the form of a coupling portion is provided for the insertion of a plug section of a sub-media line. In the form of embodiment shown in FIGS. 17 to 19 the other connection section is in the form of a connection section 161 for bonded connection, e.g. adhesion or welding, into which the sub-media line 11 is inserted, whereas in FIGS. 20 to 22 instead of this a mandrel profile 162 is provided there and connected to the hose line 114, additionally fixed by a clamping element 115. Both embodiment variants differ from each other in that in the embodiment variant shown in FIGS. 17 to 19 two sensor elements 25 injected into the housing 20 are provided and the line connection device 12 is inserted in the coupling portion 163, whereas in the embodiment variant shown in FIGS. 20 to 22 the multipart housing 220 of the measuring device 2 in which the sensor elements 25 are held in a sealing manner in sealing element 27 is included. The measuring device 2 corresponds to that shown in FIGS. 11 to 13.

Figure 17:
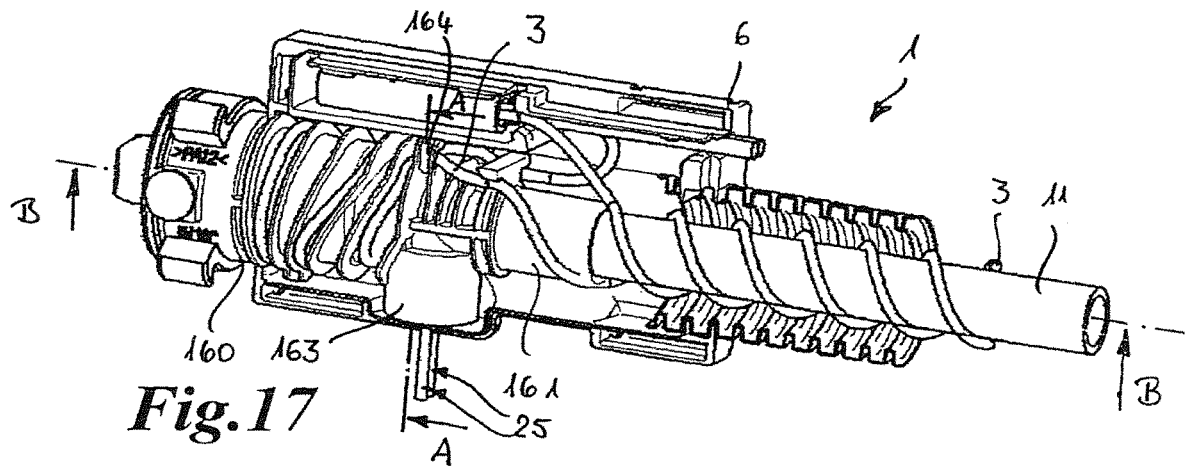
FIG. 17 shows a perspective view of another form of embodiment of a straight line connection device according to the invention.
Figure 18:
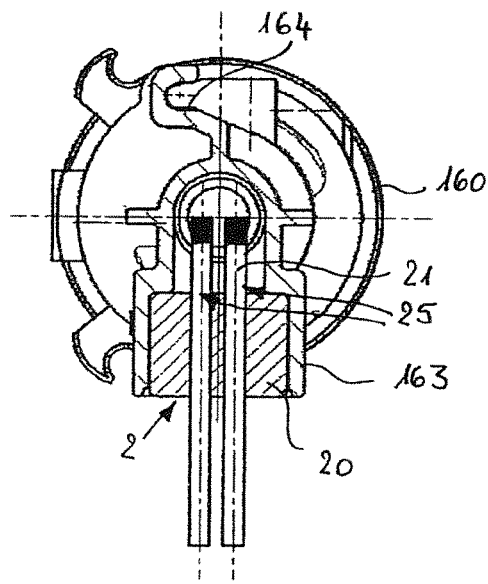
FIG. 18 shows a cross-section along line A-A of the line connection device according to FIG. 17.
Figure 19:
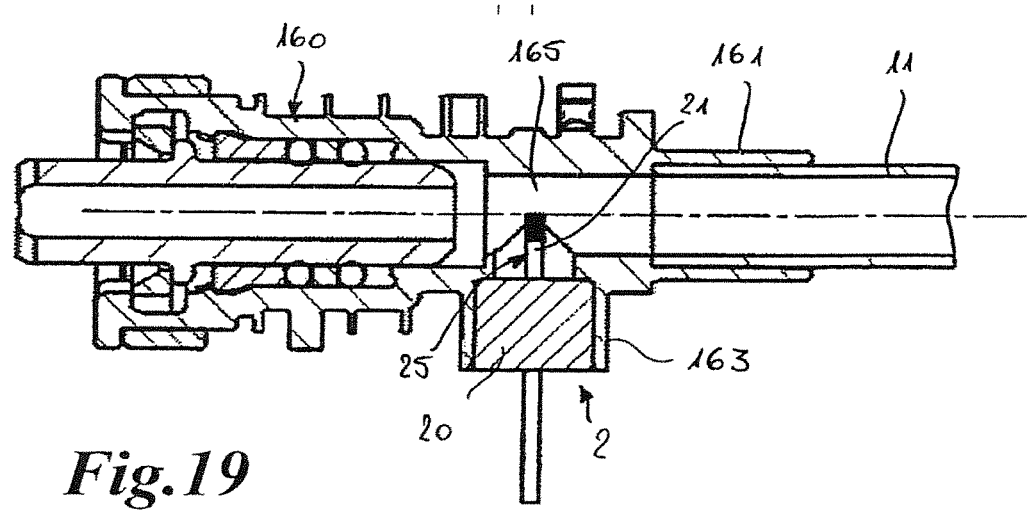
FIG. 19 shows a longitudinal section along line B-B of the line connection device according to FIG. 17.
Figure 20:
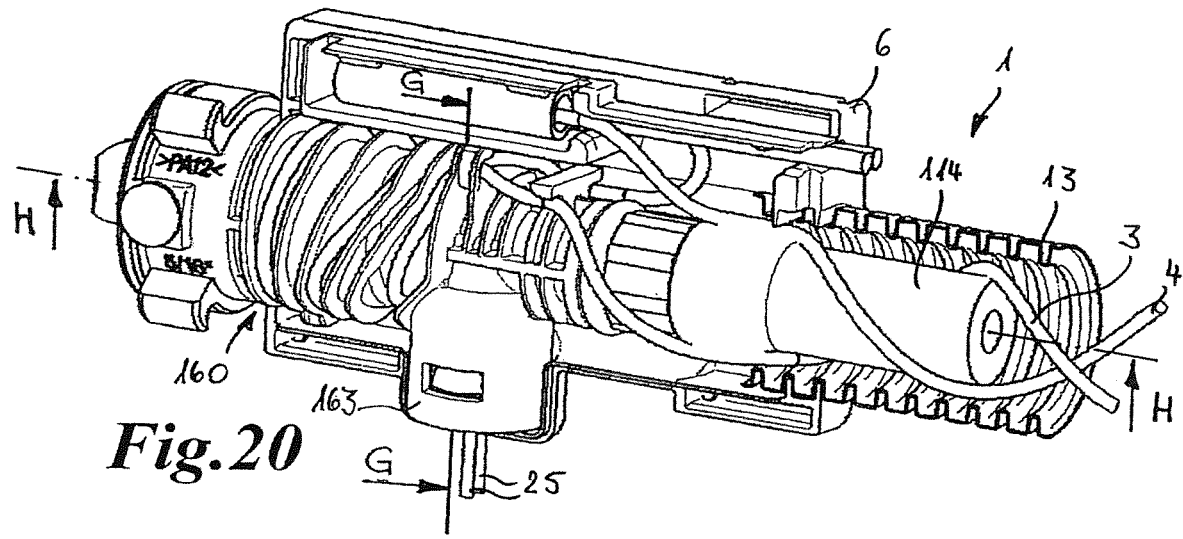
FIG. 20 shows a perspective view of a further form of embodiment of a straight line connection device according to the invention for connection two media lines to each other with a measuring device received therein.
Figure 21:
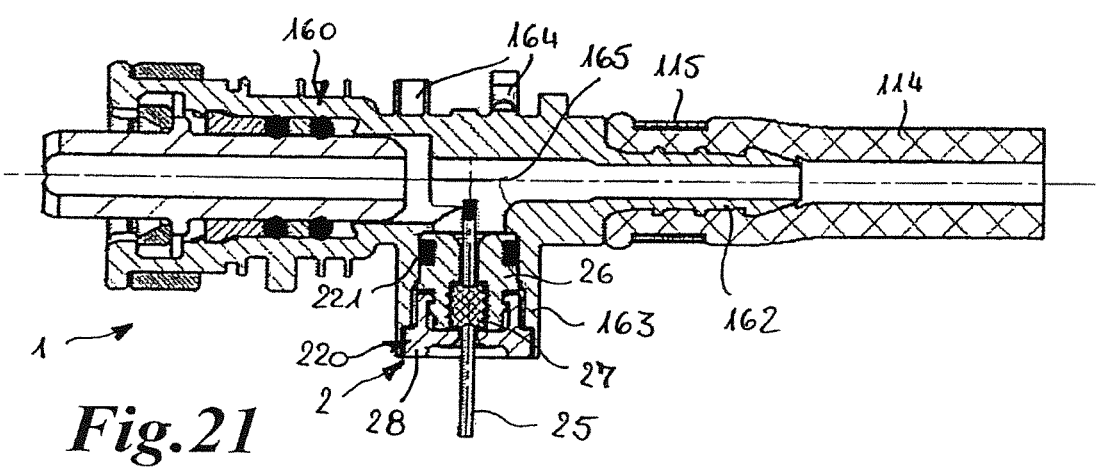
FIG. 21 shows a longitudinal section along line H-H of the line connection device according to FIG. 20.
Figure 22:
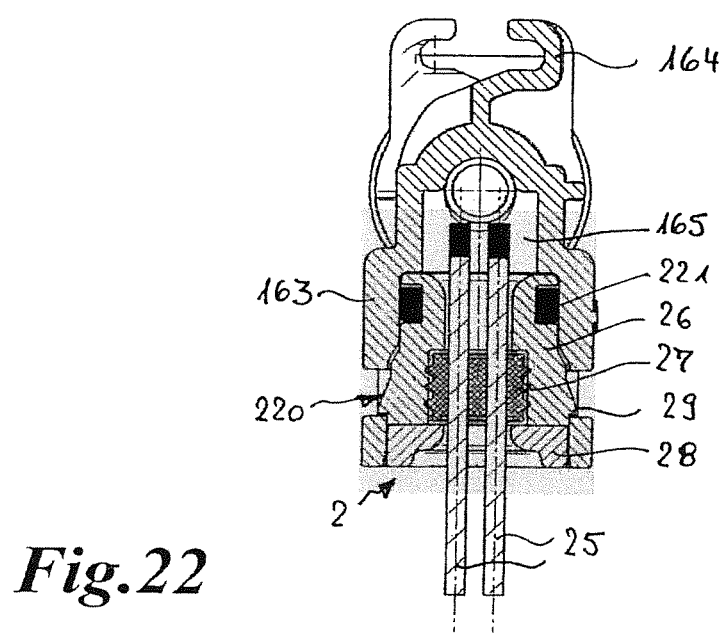
FIG. 22 shows a cross-section along line G-G of the line connection device according to FIG. 20.

Both in the form of embodiment of the multipart heatable media line 1 according to FIGS. 17 to 19 and also in that according to FIGS. 20 to 22, external encapsulations 6 are provided for thermal insulation, and the coupling portion 163, into which the relevant measuring device 2 is inserted, is arranged in the transition area between the connection sections 160, 161 and 160, 162 which are used for connection to the sub-media lines. In each case, the area surrounding the arrangement location of the measuring device 2 is also heated by the heating elements 3, 4 which are also wound round there, as can be seen particularly well in FIGS. 17 and 20. In this area the fixation elements in the form of hooks 164 are provided to which the heating element 3 is attached in order to retain this in the area of the throughflow channel 165 for the throughflow of medium in the interior of the line connection devices 12.

Figure 37:
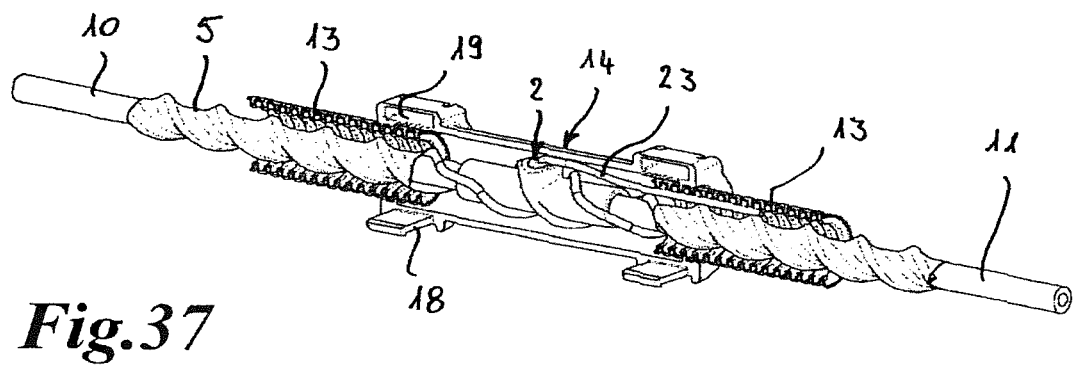
FIG. 37 shows a perspective, partial cross-sectional view of a further form or embodiment of a multipart heatable media line according to the invention, comprising two cladding tubes connected to each other by a sheath encapsulating a straight line connection device.
Figure 38:
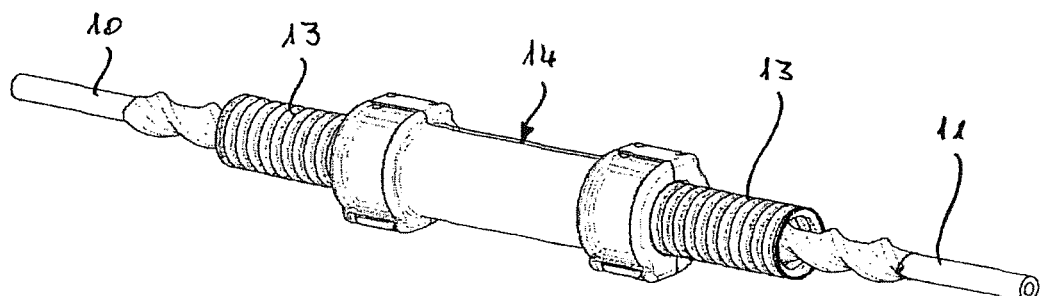
FIG. 38 shows a perspective view of the multipart heatable media line according to FIG. 37.
Figure 39:
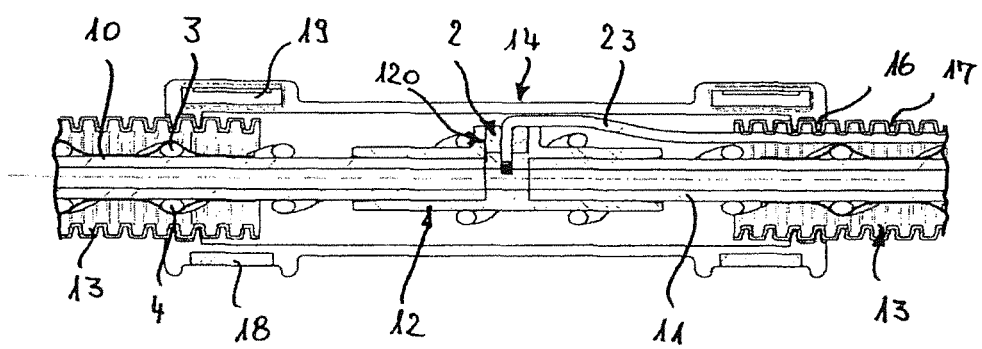
FIG. 39 shows a longitudinal section of the multipart heatable media line according to FIG. 37 in the region of the line connection device.
Figure 40:
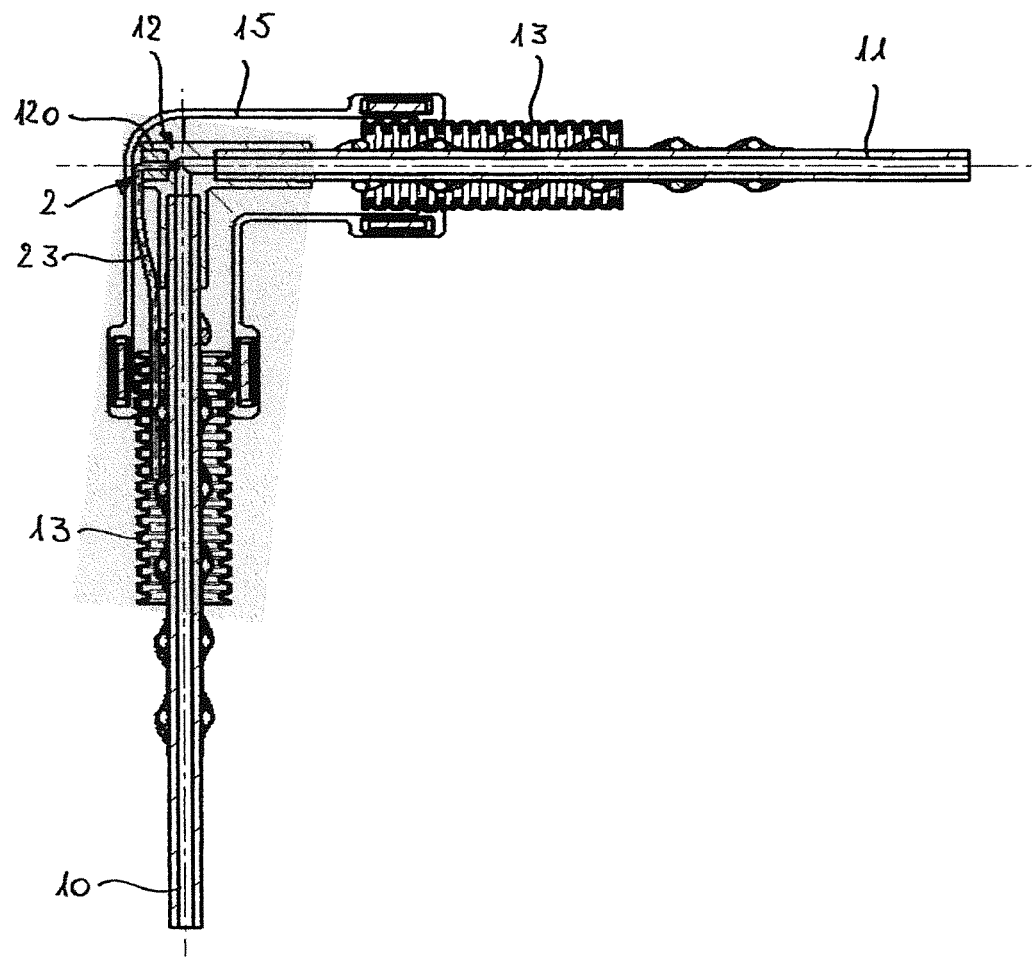
FIG. 40 shows a longitudinal section of a further form or embodiment of a multipart heatable media line according to the invention comprising two cladding tubes connected to each other by an angular line connection device.

Shown in FIGS. 37 to 39 and 40 are variants of an insulating encapsulation of the line connection device 12 and the measuring device 2 inserted therein, wherein in FIGS. 37 to 39 a straight variant and in FIG. 40 an angular variant is shown. The straight encapsulation 14 or angular encapsulation 15 connects the corrugated tube or cladding tube 13 in each case wherein it surrounds these in a sealing manner at the end. For this purpose both encapsulations 14, 15 have protruding elements 16 shaped to match the shape of the corrugation troughs 17 of the corrugated tube and essentially tightly engaging therein. The encapsulations 14, 15 are each designed as in the form of two shells wherein the half-shells are interlocked via locking elements 18 which engage in openings 19, as can be seen particularly well in FIGS. 37 and 38. Through the provision of the encapsulation 14 and 15 the coupling portion 120 and the measuring device 2 inserted therein can received in a better insulating manner than is possible through sheathing with the continuous cladding 13 according to FIG. 1 as along the sub-media lines 10 conventional cladding tubes 13 can be used and only in the region of the line connection device 12 does the encapsulation 14 of 15 have to be adapted to the outer dimensions of the line connection device with the received measuring device 2. As a result of this, standard components can be used in the region of the sub-media lines 10, 11 which leads to lower costs than if the cladding tube had to be adapted over the entire extent of the multipart heatable media line 1 to the greater dimensions in the area of the line connection device. The supply line 23 can also be included in a protected manner in the encapsulation 14, 15 without problems. There is also no threat of accidental kinking of this or the sensor element 25 during the assembly of the encapsulation 14, 15 due to the two-part nature and adaptation of the dimensions to the region of the line connection device with the measuring device 2 received therein. As a result assembly is simple and secure.

Figure 41:
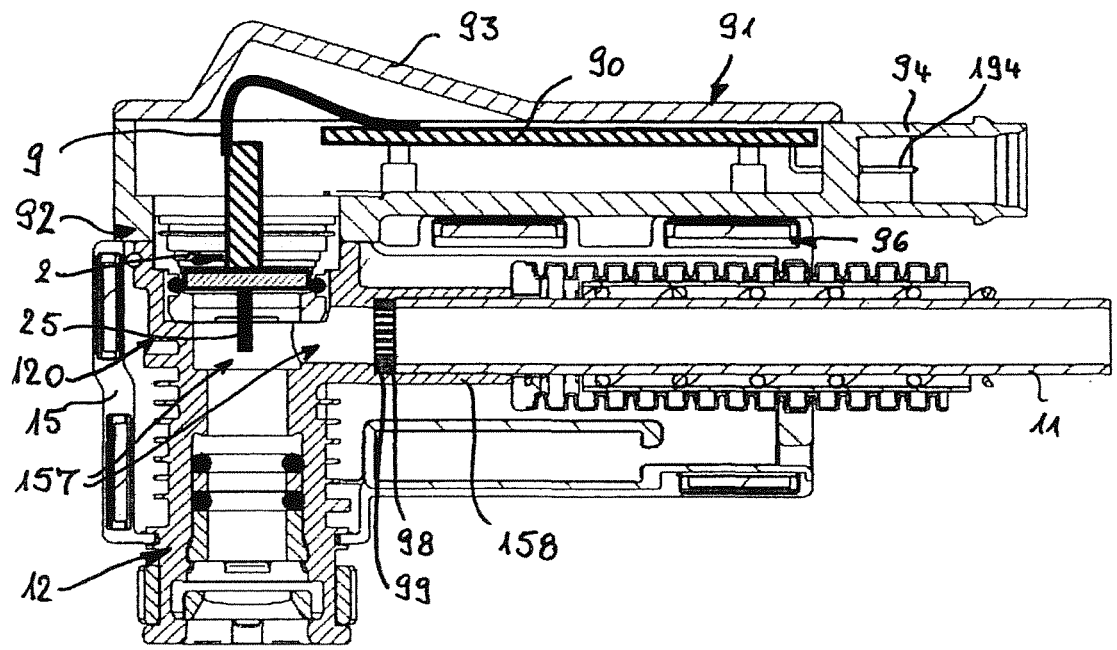
FIG. 41 shows a lateral cross-sectional view of a further form of embodiment of a line connection device according to the invention with a measuring device with a sensor element with a foil plate which is connected to a board of an evaluation unit, with a media line inserted into the line connection device and with a keeping away device, which is inserted in the line connection device as an additional component keeps ice formed by freezing medium away from the sensor element.
Figure 41A:
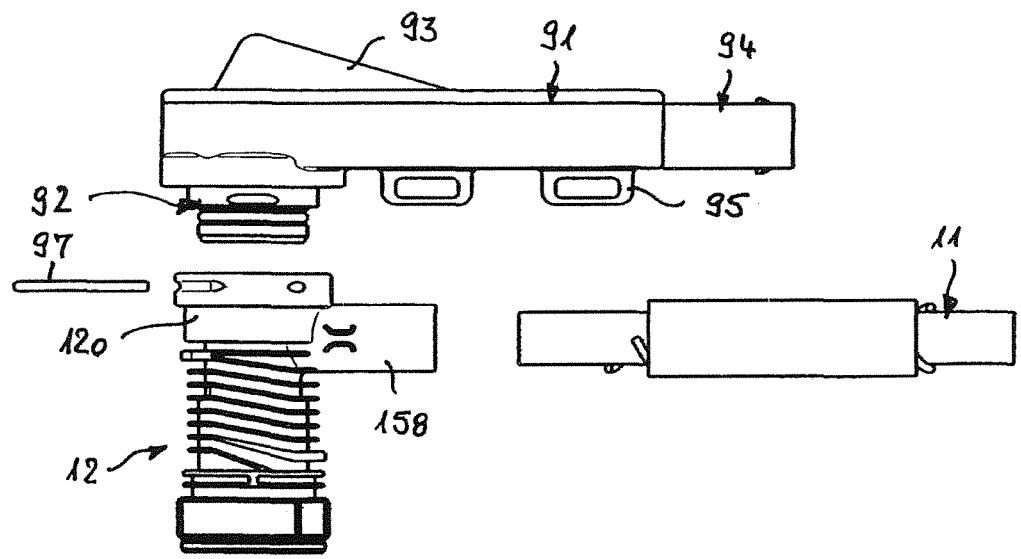
FIG. 41a shows an exploded side view of the components according to FIG. 41 in the form of the media line, the line connection device and part of the housing containing the sensor element and the evaluation unit which can be connected to a coupling portion, as well as a securing element in the form of a U-shaped clip for securing the housing part on the line connection device.

As can be seen in FIGS. 41 and 41a, the sensor element 25 is connected to a foil plate 9 and via this to a board 90 of an evaluation unit. The evaluation unit is intended for evaluating the measurements recorded by the at least one sensor element 25 and is arranged with its components on the board 90. The board 90 of or with the evaluation unit is arranged like the sensor element 25 and the film plate 9 in a housing section 91. This housing section 91 is provided with a connection section 92 in which the measuring device 2 with the sensor element 25 is received. As the foil plate 9 is only bendable to a limited extent, at least if it is not to be damaged, the housing section 91 has an extended chamber 93 into which the foil plate 9 extends. The housing section 91 is also provided with a further connection section 94 into which an electrical plug can be inserted in order to supply the evaluation device with power, or with plug connected to a data or signal line via which the evaluation data can be sent to an indicator device, for example. At least one connection pin 194 for engagement in an electrical or other plug (not shown) protrudes into the connection section 94.

As can be seen in particular in FIG. 41a, the housing section 91 also has connection tabs 95 which interlock with elements 96 of the encapsulation 15 of the line connection device 12 and can thereby fix the housing section 91 and the encapsulation 15 to each other. The housing section 91 and the line connection device 12 are attached to each other and secured in the region of the coupling portion 120 and connection section 92 of the housing section 91 via a clamp 97 as the securing element which is U-shaped when seen from above. Only after removal of the clamp 97 the coupling portion 120 and the connection section 92 be detached from each other again.

The sub-media line 11 is inserted into the connection section 158 and fastened there as has already been described above. Inserted in the connection section 158, between the end side of the sub-media line 11 and an inner stop 99 in the wall of the line connection device 12, is a keeping away device 98 in the form of a sieve element for keeping frozen medium away from the sensor element 25 in order to protect this from damage. Detailed views of the line connection device 12 with the inserted sieve element 98 and of the sieve element are shown in FIGS. 43, 43a and 43b. The keeping away device 98 reduces at least the cross-section of the throughflow channel 157 in such a way that the frozen medium is harmless for the sensor element. This can take place through constricting or reducing or decreasing the cross-section or through the provision of ribs, cross-struts or slits etc. The keeping away device therefore prevents the penetration of ice, in particularly ice fragments, into the interior of the line connection device 12 in order to prevent the ice, i.e. frozen medium, from damaging the sensor element 25. This could otherwise occur if ice pushes into the throughflow channel 157. When the medium, such as, for example, AdBlue®, i.e. aqueous urea solution, freezes, its volume increases so that the ice forming in the media line expands and also pushes into the line connection device. The keeping away device 98 or the sieve element prevent the ice penetrating into the medium or throughflow channel 157 and thus into the interior of the line connection device and also prevent the frozen medium reaching the sensor element 25. In particular the keeping away device in the form of the sieve element 98 is arranged and securely held in the vicinity of the sensor element 25 in order not to be displaced by the expanding freezing or frozen medium. Instead of being in the form of a sieve element, the keeping away device can have other forms, for example it can be designed as a triangular, star-shaped or otherwise-shaped element which prevents the frozen medium from reaching the sensor element 25. In particular, the keeping away device is designed in such a way that it only leaves through openings which have a considerably smaller diameter than the medium channel. It is also possible to provide several keeping away devices, separated from each other or combined together or also an arrangement one behind the other or next to each other of identically or differently designed elements of a keeping away device in order to prevent frozen medium penetrating into the area of the sensor element 25.

Instead of the insertion of the keeping away device 98, in particular in the form of the sieve element, as a separate additional component into the line connection device 12, the keeping away element 98 can be firmly integrated into the line connection device as is shown in FIGS. 42, 42a and 42b. Here, the keeping away device 98 or the sieve element is inserted into the medium or throughflow channel 157 at a distance from the sub-media line 11. Due to the small clear width of the throughflow channel 157 compared to that of the connection section 158, the keeping away device 98 according to FIG. 42, 42a or 42b has a smaller diameter than the keeping away device 98 according to FIG. 41, 41a or 41b. Through firmly integrating the keeping away device 98 in the throughflow channel 157, i.e. through firmly connecting or designing in one piece the keeping away device 98 with the housing or the adjacent wall of the line connection device 12 delimiting the throughflow channel 157, no supporting of the keeping away device 98 on a stop or suchlike in the interior of the line connection device 12 is necessary.

Such firm connection or integration of the keeping away device 98 in the housing of the line connection device can be envisaged through designing the keeping away device 98 in one piece with the housing or wall of the line connection device 12 or through bonded connected with these. Nevertheless, even when firmly integrated, the keeping away device 98 may be arranged supported on a stop or wall projection in order to securely withstand high pressures occurring during ice formation. Even though the keeping away device 98 is shown in the form of sieve elements inserted into the line connection device 12, the keeping away devices can just as advantageously be inserted or non-detachably integrated into the other previously described line connection devices 140, 145 as a detachable additional components.

In each of the above-described embodiment variants of multipart heatable media lines the measuring device 2 is therefore arranged in the transition area between the connection sections of the line connection device, wherein the measuring device with its housing, in which the sensor element is received, is tightly inserted into the coupling portion of the line connection device so that penetration of medium can be prevented. The relevant contact section of the at least one sensor element or the relevant sensor element(s) can protrude into the throughflow channel in the interior of the line connection device in order to be able to carry out the corresponding measurements. The at least one sensor element itself does not, however, have to be in contact with the medium, it is sufficient to let corresponding contact elements leading to the at least one sensor element protrude into the throughflow channel in the interior of the line connection device.

In addition to the embodiments of multipart heatable media lines described above and shown in the figures, numerous others can also be envisaged, in which the at least one heating element of the at least one sub-media line not only extends along this, but also along the connection device in the region of its coupling portion in which the at least one measuring device is received in order to heat the coupling portion and thereby to be able to prevent freezing of the medium or be able to thaw out already frozen medium in order to be able to carry out optimal measurement of parameters of the medium.

REFERENCE LIST

1 Multipart heatable media line
2 Measuring device
3 Heating element
4 Heating element
5 Fixing tape
6 External encapsulation
7 Electrical supply line
8 Electrical supply line
9 Foil plate
10 First sub-media line
11 Second sub-media line
12 Line connection device
13 Corrugated tube/cladding tube/sheathing
14 Encapsulation
15 Encapsulation
16 Protruding element
17 Corrugation trough
18 Locking element
19 Opening
20 Housing
21 Contact section 22 Chamfered end section
23 Supply line
24 Front end
25 Sensor element
26 Outer casing section
27 Sealing element
28 Holding element
29 Locking nose
30 Loop
31 Crimp connection
32 Electrical supply line
40 Loop
41 Crimp connection
42 Electrical supply line
90 Board with evaluation unit
91 Housing section
92 Connection section
93 Extended chamber
94 Connection section
95 Connection tab
96 Engageable element
97 U-shaped clamp
98 Keeping away device/sieve element
99 Inner stop
100 Pre-assembled media line
101 Pipe-like media line
101 Separated section
110 Wall of 10
111 Wall of 11
112 End of 10
113 End of 11
114 Hose line
115 Clamping element
120 Coupling portion
120a Thermally conductive material
121 Connection section
122 Connection section
123 Wall
124 Throughflow channel
125 Section
126 Section
127 Chamfer
128 Coupling section
129 Connection section
130 Connection section
140 Line connection device
141 Fixing element
142 Coupling portion
143 Fixing element
144 Clamping element
145 Angle connector/line connection device
146 Connection section
147 Coupling section
149 Opening
150 Housing
151 Coupling section
152 Fixing element/hook
153 Mandrel profile/connection section
154 Coupling portion/connection section
155 Holding element
156 Clamping element
157 Inner throughflow channel/throughflow channel/medium channel
158 Connection section
160 Coupling portion/connection section
161 Connection section
162 Mandrel profile
163 Coupling portion
164 Hook/fixing element
165 Thoughflow channel
194 Connection pin
220 Multipart housing
221 Sealing element
a Distance
$d_i$ Throughflow diameter
$d_{10}$ Inner diameter of 10
$d_{11}$ Inner diameter of 11
$d_m$ Inner diameter of 121
$d_{42}$ Inner diameter of 122
$d_{125}$ Inner diameter of 125
$d_{126}$ Inner diameter of 126
$w_{10}$ Wall thickness of 110
$w_{11}$ Wall thickness of 111
P1 Arrow

What is claimed is:

1. A multipart heatable media line, comprising:
   at least two sub-media lines, at least one heating element for heating the sub-media lines,
   at least one line connection device with connection sections for connecting to the sub-media lines and at least one measuring device,
   wherein the line connection device has at least one medium channel for conducting the medium through the line connection device from one connection section to the at least one other connection section,
   wherein the measuring device comprises at least one sensor element and is received in a receiving opening of the line connection device designed as a coupling portion,
   wherein the measuring device comprises at least one housing which is designed as a plug connector and which at least partly receives the at least one sensor element and the at least one heating element of the at least one sub-media line extends in the region of the coupling portion for receiving the measuring device in order to heat the line connection device in the arrangement region of the measuring device, and
   wherein the measuring device is received in the coupling section sealed off in a bonded manner against penetration of medium.

2. The multipart heatable media line according to claim 1, wherein at least one insulating and/or protecting encapsulation is provided, at least of an area which surrounds the at least one measuring device received in the coupling portion, or of the at least one measuring device.

3. The multipart heatable media line according to claim 2, wherein the insulating encapsulation can be or is connected with at least two cladding tubes to the insulating encapsulation of the sub-media lines in the region of the coupling portion receiving the measuring device.

4. The multipart heatable media line according to claim 1, wherein the coupling portion is spatially arranged between the connection sections of the line connection device and into which the at least one measuring device for measuring at least one parameter of a medium flowing through the medium channel of the line connection device is or can be inserted, and
   wherein at least one fastening or fixing device for attaching a heating element for heating the coupling portion and/or the medium flowing in the region of the coupling portion is provided.

5. The multipart heatable media line according to claim 4, wherein the coupling portion is made of a thermally conductive plastic material.

6. The multipart heatable media line according to claim 5, wherein at least at the end in the region of its connection sections the line connection device is made of a laser transparent material for connecting to the sub-media lines through laser welding, wherein the at least one sensor element is provided with a foil plate or is arranged on a foil plate or on a board of an evaluation unit or is connected thereto, and wherein at least one keeping away device for keeping frozen medium away from the at least one sensor element of the at least one measuring device in order to prevent damage to the at least one sensor element through frozen medium is integrated into the line connection device or is or can be inserted as a separate element into the line connection device.

7. The multipart heatable media line according to claim 4, wherein at least at the end in the region of its connection sections the line connection device is made of a laser transparent material for connecting to the sub-media lines through laser welding.

8. The multipart heatable media line according to claim 4, wherein the at least one sensor element is provided with a foil plate or is arranged on a foil plate or on a board of an evaluation unit or is connected thereto.

9. The multipart heatable media line according to claim 4, wherein at least one keeping away device for keeping frozen medium away from the at least one sensor element of the at least one measuring device in order to prevent damage to the at least one sensor element through frozen medium is integrated into the line connection device or is or can be inserted as a separate element into the line connection device.

10. The multipart heatable media line according to claim 1, wherein the sensor element is connected to the housing in a bonded manner or is integrated in the housing through overmoulding, and wherein an outer side the line connection device has at least one fastening or fixing device for attaching the at least one heating element.

11. The multipart heatable media line according to claim 10, wherein at least one insulating and/or protecting encapsulation is provided, at least of an area which surrounds the at least one measuring device received in the coupling portion or of the at least one measuring device, and wherein the insulating encapsulation can be or is connected with at least two cladding tubes to the insulating encapsulation of the sub-media lines in the region of the coupling portion receiving the measuring device.

12. The multipart heatable media line according to claim 10, wherein the sensor element is connected to the housing through adhesion, welding, or soldering.

13. The multipart heatable media line according to claim 12, wherein at least one insulating and/or protecting encapsulation is provided, at least of an area which surrounds the at least one measuring device received in the coupling portion, or of the at least one measuring device.

14. The multipart heatable media line according to claim 13, wherein the insulating encapsulation can be or is connected with at least two cladding tubes to the insulating encapsulation of the sub-media lines in the region of the coupling portion receiving the measuring device.

15. A multipart heatable media line, comprising:
at least two sub-media lines, at least one heating element for heating the sub-media lines,
at least one line connection device with connection sections for connecting to the sub-media lines and at least one measuring device,
wherein the line connection device has at least one medium channel for conducting the medium through the line connection device from one connection section to the at least one other connection section,
wherein the measuring device comprises at least one sensor element and is received in a receiving opening of the line connection device designed as a coupling portion,
wherein the measuring device comprises at least one housing which is designed as a plug connector and which at least partly receives the at least one sensor element and the at least one heating element of the at least one sub-media line extends in the region of the coupling portion for receiving the measuring device in order to heat the line connection device in the arrangement region of the measuring device, and
wherein the sensor element is connected to the housing in a bonded manner or is integrated in the housing through overmoulding.

16. The multipart heatable media line according to claim 3, wherein the sensor element is connected to the housing through adhesion, welding, or soldering.

17. The multipart heatable media line according to claim 16, wherein the sensor element is connected to the housing through friction welding, ultrasonic welding or laser welding.

18. The multipart heatable media line according to claim 16, wherein an outer side of the line connection device has at least one fastening or fixing device for attaching the at least one heating element.

19. The multipart heatable media line according to claim 18, wherein at least one insulating and/or protecting encapsulation is provided, at least of an area which surrounds the at least one measuring device received in the coupling portion, or of the at least one measuring device.

20. The multipart heatable media line according to claim 19, wherein the insulating encapsulation can be or is connected with at least two cladding tubes to the insulating encapsulation of the sub-media lines in the region of the coupling portion receiving the measuring device.

21. A multipart heatable media line, comprising:
at least two sub-media lines, at least one heating element for heating the sub-media lines,
at least one line connection device with connection sections for connecting to the sub-media lines and at least one measuring device,
wherein the line connection device has at least one medium channel for conducting the medium through the line connection device from one connection section to the at least one other connection section,
wherein the measuring device comprises at least one sensor element and is received in a receiving opening of the line connection device designed as a coupling portion,
wherein the measuring device comprises at least one housing which is designed as a plug connector and which at least partly receives the at least one sensor element and the at least one heating element of the at least one sub-media line extends in the region of the coupling portion for receiving the measuring device in order to heat the line connection device in the arrangement region of the measuring device,
wherein an outer side of the line connection device has at least one fastening or fixing device for attaching the at least one heating element.

22. The multipart heatable media line according to claim 5, wherein at least one insulating and/or protecting encapsulation is provided, at least of an area which surrounds the at least one measuring device received in the coupling portion, or of the at least one measuring device.

23. The multipart heatable media line according to claim 22, wherein the insulating encapsulation can be or is connected with at least two cladding tubes to the insulating encapsulation of the sub-media lines in the region of the coupling portion receiving the measuring device.

24. A method of producing the multipart heatable media line according to claim 1, comprising the steps of:
- providing the pre-assembled media line with the at least one heating element wound around it,
- severing only the pre-assembled media line, not the at least one heating element so that two of the at least two sub-media lines result at the severing point,
- winding the at least one heating element back on both sub-media lines in the area of the severing point of the pre-assembled media line,
- connecting the line connection device with the coupling portion for receiving the measuring device and with the at least two connection sections at both connections sections to the two sub-media lines, and
- winding the at least one heating element around the line connection device.

25. The method according to claim 24, wherein for the connection of the connection sections of the line connection device to the sub-media lines, the heating element is held out of the region of the connection sections of the line connection device, by way of a fixing device for fixing the unwound heating element loop.

26. The method according to claim 25, wherein the at least one housing of the measuring device is inserted into the coupling section and fixed therein in an non-detachable manner.

27. The method according to claim 24, wherein the at least one housing of the measuring device is inserted into the coupling section and fixed therein in an non-detachable manner.

* * * * *